US010847838B2

(12) United States Patent
Morinaka et al.

(10) Patent No.: US 10,847,838 B2
(45) Date of Patent: Nov. 24, 2020

(54) ELECTROLYTE SOLUTION FOR NON-AQUEOUS ELECTROLYTIC SOLUTION BATTERY AND NON-AQUEOUS ELECTROLYTE SOLUTION BATTERY USING SAME

(71) Applicant: Central Glass Co., Ltd., Ube (JP)

(72) Inventors: Takayoshi Morinaka, Ube (JP); Makoto Kubo, Ube (JP); Wataru Kawabata, Ube (JP); Kenta Yamamoto, Saitama (JP); Mikihiro Takahashi, Ube (JP)

(73) Assignee: Central Glass Co., Ltd., Ube (JP)

( * ) Notice: Subject to any disclaimer, the term of this patent is extended or adjusted under 35 U.S.C. 154(b) by 0 days.

(21) Appl. No.: 15/500,984

(22) PCT Filed: Jul. 10, 2015

(86) PCT No.: PCT/JP2015/069939
§ 371 (c)(1),
(2) Date: Feb. 1, 2017

(87) PCT Pub. No.: WO2016/017404
PCT Pub. Date: Feb. 4, 2016

(65) Prior Publication Data
US 2017/0222264 A1 Aug. 3, 2017

(30) Foreign Application Priority Data
Aug. 1, 2014 (JP) ................................. 2014-157872

(51) Int. Cl.
*H01M 10/0525* (2010.01)
*H01M 10/0567* (2010.01)
*H01M 10/0568* (2010.01)
*H01M 10/0569* (2010.01)
*H01M 10/052* (2010.01)

(52) U.S. Cl.
CPC ..... *H01M 10/0567* (2013.01); *H01M 10/052* (2013.01); *H01M 10/0525* (2013.01); *H01M 10/0568* (2013.01); *H01M 10/0569* (2013.01); *H01M 2300/0025* (2013.01); *H01M 2300/0042* (2013.01)

(58) Field of Classification Search
CPC ......... H01M 10/0567; H01M 10/0525; H01M 10/052; H01M 10/0568; H01M 10/0569; H01M 2300/0025; H01M 2300/0042
See application file for complete search history.

(56) References Cited

U.S. PATENT DOCUMENTS

| | | | |
|---|---|---|---|
| 5,885,733 A | 3/1999 | Ohsawa et al. | |
| 2002/0012850 A1 | 1/2002 | Schmidt et al. | |
| 2002/0076619 A1 | 6/2002 | Yamada et al. | |
| 2004/0007688 A1 | 1/2004 | Awano et al. | |
| 2010/0015514 A1 | 1/2010 | Miyagi et al. | |
| 2011/0117446 A1 | 5/2011 | Lucht et al. | |
| 2012/0315536 A1* | 12/2012 | Bhat | ....................... C07F 9/095 429/199 |
| 2013/0224578 A1* | 8/2013 | Sawa | ................ H01M 10/0525 429/200 |
| 2014/0045076 A1 | 2/2014 | Shishikura et al. | |
| 2014/0193706 A1 | 7/2014 | Morinaka et al. | |

FOREIGN PATENT DOCUMENTS

| | | |
|---|---|---|
| CN | 101292389 A | 10/2008 |
| CN | 103797634 A | 5/2014 |
| JP | 8-78053 A | 3/1996 |
| JP | 2002-33127 A | 1/2002 |
| JP | 2002-134169 A | 5/2002 |
| JP | 2004-39510 A | 2/2004 |
| JP | 2004-87459 A | 3/2004 |

(Continued)

OTHER PUBLICATIONS

English machine translation of JP2007180015 (Year: 2007).*
International Search Report (PCT/ISA/210) issued in PCT Application No. PCT/JP2015/069939 dated Sep. 8, 2015 with English translation (Four (4) pages).
Japanese-language Written Opinion (PCT/ISA/237) issued in PCT Application No. PCT/JP2015/069939 dated Sep. 8, 2015 (Three (3) pages).
Chinese-language Office Action issued in counterpart Chinese Application No. 201580053638.4 dated Nov. 19, 2018 with unverified English translation (16 pages).

*Primary Examiner* — Lisa S Park
(74) *Attorney, Agent, or Firm* — Crowell & Moring LLP

(57) ABSTRACT

The present invention provides an electrolyte solution for a non-aqueous electrolyte solution battery capable of exhibiting excellent high-temperature cycle characteristics and excellent high-temperature storage characteristics at high temperature of 60° C. or above, and a non-aqueous electrolyte solution battery using the same. The electrolyte solution for a non-aqueous electrolyte solution battery of the present invention comprises at least: a non-aqueous solvent; a solute; at least one first compound represented by the following general formula (1); and at least one second compound represented by the following general formula (2).

$$A^{a+}{}_b \left[ (R^2)_n - M \underset{X^2}{\overset{X^1-X^3}{\Bigg<}} \left\{ \begin{matrix} (O)_q \\ (R^1)_p \\ O \end{matrix} \right\}_m \right]^{c-}{}_d \quad (1)$$

$$Si(R^3)_x(R^4)_{4-x} \quad (2)$$

8 Claims, No Drawings

(56) References Cited

FOREIGN PATENT DOCUMENTS

| | | |
|---|---|---|
| JP | 2005-32714 A | 2/2005 |
| JP | 2007-180015 A | 7/2007 |
| JP | 2010-205474 A | 9/2010 |
| JP | 2010-238506 A | 10/2010 |
| JP | 2011-527090 A | 10/2011 |
| JP | 2013-175410 A | 9/2013 |
| WO | WO 2012/147566 A1 | 11/2012 |

* cited by examiner

ELECTROLYTE SOLUTION FOR NON-AQUEOUS ELECTROLYTIC SOLUTION BATTERY AND NON-AQUEOUS ELECTROLYTE SOLUTION BATTERY USING SAME

TECHNICAL FIELD

The present invention relates to an electrolyte solution for a non-aqueous electrolyte solution battery comprising a specific electrolyte salt and a specific silane compound, and a non-aqueous electrolyte solution battery using the electrolyte solution.

BACKGROUND ART

Recently, attention has been focused on electric storage systems for use in small devices such as information-related devices or communication devices, i.e., personal computers, video cameras, digital still cameras, and mobile phones, which require high energy densities, and on electric storage systems for use in large devices such as electric automobiles, hybrid vehicles, auxiliary power supplies for fuel cell vehicles, and electrical energy storages, which require high power. As a class of candidates for such electric storage systems, non-aqueous electrolyte solution batteries such as lithium ion batteries, lithium batteries, lithium ion capacitors, and sodium ion batteries have been actively developed.

Many non-aqueous electrolyte solution batteries have already been put to practical use, but their durability is not satisfactory for various applications. Especially, such non-aqueous electrolyte solution batteries greatly degrade when the ambient temperature is 60° C. or above. Hence, such non-aqueous electrolyte solution batteries present problems in applications for, for example, automobiles used at high-temperature places for long periods.

Until now, as means for improving the high temperature characteristics of non-aqueous electrolyte solution batteries and the battery characteristics (cycle characteristics) in the case of repeated charge and discharge, various battery constituents, including active materials in the positive electrode and the negative electrode, have been optimized. Non-aqueous electrolyte solution-related techniques are no exceptions, and it is proposed that various additives are used to inhibit degradation due to decomposition of the electrolyte solution on the active surface of a positive electrode or a negative electrode. For example, Patent Literature 1 proposes a method in which increase in internal resistance and degradation of cycle characteristics of a battery are suppressed by adding lithium difluoro (bis(oxalato))phosphate, lithium difluoro(oxalato)borate, or the like to a non-aqueous electrolyte solution. However, there may be a demand for further improvement in the effects of these additives in some cases. In addition, Patent Literatures 2 to 5 propose methods in which a silicon compound, such as a silicone compound or a fluorosilane compound, is added to a non-aqueous electrolyte solution to improve the cycle characteristics of a non-aqueous electrolyte solution battery, and improve the low-temperature characteristics thereof by suppressing the increase in internal resistance. Moreover, Patent Literatures 6 and 7 propose a method in which a combination of a specific silicon fluoride compound and lithium bis(oxalato) borate is added to a non-aqueous electrolyte solution to improve the cycle characteristics of a non-aqueous electrolyte solution battery and the resistance increase suppression effect therein.

CITATION LIST

Patent Literatures

Patent Literature 1: Japanese Patent Application Publication No. 2005-032714

Patent Literature 2: Japanese Patent Application Publication No. Hei 8-078053

Patent Literature 3: Japanese Patent Application Publication No. 2002-033127

Patent Literature 4: Japanese Patent Application Publication No. 2004-039510

Patent Literature 5: Japanese Patent Application Publication No. 2004-087459

Patent Literature 6: Japanese Patent Application Publication No. 2010-205474

Patent Literature 7: Japanese Patent Application Publication No. 2010-238506

SUMMARY OF INVENTION

Technical Problems

Considering the intended use at high temperature of 60° C. or above, there may be a demand for further improvement in the high-temperature cycle characteristics and the high-temperature storage characteristics of the non-aqueous electrolyte solution batteries using the non-aqueous electrolyte solutions disclosed in Patent Literatures 1 to 7 in some cases, and there is a room for improvement. The present invention is to provide an electrolyte solution for a non-aqueous electrolyte solution battery capable of exhibiting excellent high-temperature cycle characteristics and excellent high-temperature storage characteristics at high temperature of 60° C. or above, and a non-aqueous electrolyte solution battery using the electrolyte solution.

Solution to Problems

The present inventors have conducted intensive study to solve such problems, and consequently have found that when an electrolyte solution for a non-aqueous electrolyte solution battery comprising a specific electrolyte salt and a specific silane compound is used for a non-aqueous electrolyte solution battery, the electrolyte solution makes it possible to exhibit excellent high-temperature cycle characteristics and excellent high-temperature storage characteristics. This finding has led to the present invention.

Specifically, the present invention provides an electrolyte solution for a non-aqueous electrolyte solution battery (hereinafter, sometimes simply referred to as "non-aqueous electrolyte solution" or "electrolyte solution"), comprising at least:

a non-aqueous solvent;

a solute;

at least one first compound represented by the following general formula (1); and at least one second compound represented by the following general formula (2):

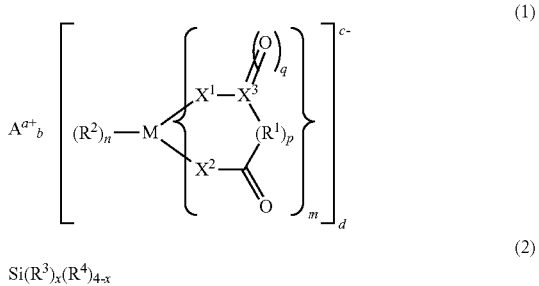

(2)

Si(R³)ₓ(R⁴)₄₋ₓ wherein, in general formula (1), M represents a boron atom, a phosphorus atom, or a silicon atom, m is 1 to 3, n is 1 to 4, and p is 0 or 1; R¹ represents an alkylene group having 3 to 10 carbon atoms, a halogenated alkylene group having 3 to 10 carbon atoms, an arylene group having 6 to 20 carbon atoms, or a halogenated arylene group having 6 to 20 carbon atoms, provided that these groups may have substituents and/or contain heteroatoms in their structures, and that when m is 2 or greater, any ones of R¹s, the number of which is m, may be bonded to each other, R² represents a halogen atom, X¹ and X² each independently represent an oxygen atom or a sulfur atom, and X³ represents a carbon atom or a sulfur atom; q is 1 when X³ is a carbon atom, or 1 or 2 when X³ is a sulfur atom; $A^{a+}$ represents an alkali metal cation, an alkaline earth metal cation, or an onium cation, and a represents the valence of the cation; and a to d are each 1 or 2, and a×b=c×d is satisfied, and wherein, in general formula (2), R³s each independently represent a group having a carbon-carbon unsaturated bond; R⁴s each independently represent a group selected from the group consisting of a fluorine atom, an alkyl group, an alkoxy group, an alkenyl group, an alkenyloxy group, an alkynyl group, an alkynyloxy group, an aryl group, and an aryloxy group, provided that these groups may contain fluorine atoms and/or oxygen atoms; and x is 2 to 4.

It is important that the number of the groups having a carbon-carbon unsaturated bond and being represented by R³s in general formula (2) be 2 or more (x be 2 or greater). The coexistence of the second compound having this structure with the first compound in the electrolyte solution makes it possible to exhibit excellent high-temperature cycle characteristics and excellent high-temperature storage characteristics, when the electrolyte solution is used for a non-aqueous electrolyte solution battery. It is further preferable that x in general formula (2) above be 2 to 3, from the viewpoint of output characteristics.

The concentration of the above-described first compound is preferably in a range from 0.07 to 7.0% by mass relative to the total amount of the electrolyte solution for a non-aqueous electrolyte solution battery.

In addition, the concentration of the above-described second compound is preferably in a range from 0.005 to 7.0% by mass relative to the total amount of the electrolyte solution for a non-aqueous electrolyte solution battery.

In addition, the first compound is preferably selected from the group consisting of bis(oxalato)boric acid salts, difluoro(oxalato)boric acid salts, tris(oxalato)phosphoric acid salts, difluorobis(oxalato)phosphoric acid salts, tetrafluoro(oxalato)phosphoric acid salts, and tetrafluoro(malonato)phosphoric acid salts.

In addition, the groups represented by R³s in general formula (2) above are each independently preferably a group selected from the group consisting of a vinyl group, an allyl group, a 1-propenyl group, an ethynyl group, and a 2-propynyl group.

In addition, the groups represented by R⁴s in general formula (2) above are each independently preferably a group selected from the group consisting of a fluorine atom, a methyl group, an ethyl group, a propyl group, a 2,2,2-trifluoroethyl group, a 2,2,3,3-tetrafluoropropyl group, a 1,1,1-trifluoroisopropyl group, a 1,1,1,3,3,3-hexafluoroisopropyl group, a 2,2,2-trifluoroethoxy group, a 2,2,3,3-tetrafluoropropoxy group, a 2,2,3,3,3-pentafluoropropoxy group, a 1,1,1-trifluoroisopropoxy group, and a 1,1,1,3,3,3-hexafluoroisopropoxy group.

In addition, the solute is preferably at least one selected from the group consisting of lithium hexafluorophosphate (LiPF₆), lithium tetrafluoroborate (LiBF₄), lithium bis(trifluoromethanesulfonyl)imide (LiN(CF₃SO₂)₂), lithium bis(fluorosulfonyl)imide (LiN(FSO₂)₂), lithium bis(difluorophosphoryl)imide (LiN(POF₂)₂), and lithium difluorophosphate (LiPO₂F₂).

In addition, the non-aqueous solvent is preferably at least one selected from the group consisting of cyclic carbonates, open-chain carbonates, cyclic esters, open-chain esters, cyclic ethers, open-chain ethers, sulfone compounds, sulfoxide compounds, and ionic liquids.

In addition, the present invention also provides a non-aqueous electrolyte solution battery, comprising at least:
a positive electrode;
a negative electrode; and
an electrolyte solution for a non-aqueous electrolyte solution battery, wherein
the electrolyte solution for a non-aqueous electrolyte solution battery is the above-described electrolyte solution for a non-aqueous electrolyte solution battery.

Effects of Invention

The present invention makes it possible to provide an electrolyte solution for a non-aqueous electrolyte solution battery, the electrolyte solution making it possible to exhibit excellent high-temperature cycle characteristics and excellent high-temperature storage characteristics at high temperature of 60° C. or above, when used for a non-aqueous electrolyte solution battery. In addition, it is also possible to provide a non-aqueous electrolyte solution battery which uses the electrolyte solution, and which exhibits excellent high-temperature cycle characteristics and excellent high-temperature storage characteristics at high temperature of 60° C. or above.

DESCRIPTION OF EMBODIMENTS

Hereinafter, the present invention is described in detail; however, the description of constituents below is an example of embodiments of the present invention, and the present invention is not limited to these specific contents. The present invention can be carried out with various modifications within the gist of the present invention.

An electrolyte solution for a non-aqueous electrolyte solution battery of the present invention comprises at least:
a non-aqueous solvent;
a solute;
at least one first compound represented by the following general formula (1), and
at least one second compound represented by the following general formula (2):

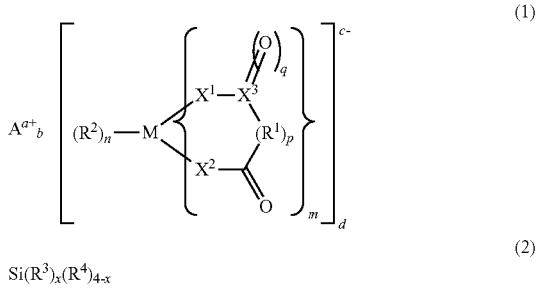

(2)

$$Si(R^3)_x(R^4)_{4-x}$$

wherein, in general formula (1), M represents a boron atom, a phosphorus atom, or a silicon atom, and m is 1 to 3, n is 1 to 4, and p is 0 or 1; $R^1$ represents an alkylene group having 3 to 10 carbon atoms, a halogenated alkylene group having 3 to 10 carbon atoms, an arylene group having 6 to 20 carbon atoms, or a halogenated arylene group having 6 to 20 carbon atoms, provided that these groups may have substituents and/or contain heteroatoms in their structures; when m is 2 or greater, any ones of $R^1$s, the number of which is m, may be bonded to each other, $R^2$ represents a halogen atom, $X^1$ and $X^2$ each independently represent an oxygen atom or a sulfur atom, and $X^3$ represents a carbon atom or a sulfur atom; q is 1 when $X^3$ is a carbon atom, or 1 or 2 when $X^3$ is a sulfur atom; $A^{a+}$ represents an alkali metal cation, an alkaline earth metal cation, or an onium cation, and a represents the valence of the cation; and a to d are each 1 or 2, and a×b=c×d is satisfied; and wherein, in general formula (2), $R^3$s each independently represent a group having a carbon-carbon unsaturated bond; $R^4$s each independently represent a group selected from the group consisting of a fluorine atom, an alkyl group, an alkoxy group, an alkenyl group, an alkenyloxy group, an alkynyl group, an alkynyloxy group, an aryl group, and an aryloxy group, provided that these groups may contain fluorine atoms and/or oxygen atoms; and x is 2 to 4.

Each of the above-described first compounds decomposes on the positive electrode and the negative electrode to form coating films having excellent ion conductivity on the surfaces of the positive electrode and the negative electrode. Each of the coating films inhibits the direct contact of the electrode active material with the non-aqueous solvent and with the solute to prevent decomposition of the non-aqueous solvent and the solute, so that the deterioration of the performance of the battery is suppressed. However, when the first compound alone is used instead of using the first compound and the second compound in combination, the high-temperature cycle characteristics and high-temperature storage characteristics of the obtained non-aqueous electrolyte solution battery at high temperature of 60° C. or above may be insufficient in some cases.

In addition, the second compound also has an effect of suppressing the degradation of the battery by forming stable coating films on the surfaces of the positive electrode and the negative electrode. However, when the second compound alone is used instead of using the first compound and the second compound in combination, the high-temperature cycle characteristics and high-temperature storage characteristics of the obtained non-aqueous electrolyte solution battery at high temperature of 60° C. or above may be insufficient in some cases.

The details of the mechanism by which the use of the first compound and the second compound in combination in the electrolyte solution for a non-aqueous electrolyte solution battery of the present invention improves the high-temperature cycle characteristics and the high-temperature storage characteristics at high temperature of 60° C. or above in comparison with the case where any of the first compound is added alone is not elucidated. However, this is presumably because the coexistence of the first compound and the second compound leads to the formation of better coating films derived from the mixture composition of the first compound and the second compound, so that the decomposition of the solvent and the solute at high temperature is suppressed, or because the coating film formed of the second compound covers the surface of the coating film formed of the first compound, so that the reaction of the coating film formed of the first compound with the solvent or the solute at high temperature is inhibited. In addition, the amount of decomposition gas developed from the electrolyte solution at high temperature of 60° C. or above tends to be smaller in a case where the first compound and the second compound are used in combination than in a case where any of the first compounds is added alone. The effect of reducing the amount of the decomposition gas developed can be considered to be brought about by the excellent coating films as described above.

As described above, the use of the first compound and the second compound in combination makes it possible to improve the high-temperature cycle characteristics and the high-temperature storage characteristics of a battery at high temperature of 60° C. or above in comparison with the cases where one of the first compound and the second compound is used alone.

A preferred concentration of the first compound is 0.07% by mass or higher, preferably 0.3% by mass or higher, and further preferably 0.5% by mass or higher, while the upper limit is 7.0% by mass or lower, preferably 4.5% by mass or lower, and further preferably 3.5% by mass or lower, relative to the total amount of the non-aqueous electrolyte solution. A concentration thereof lower than 0.07% by mass is not preferable, because it is difficult to sufficiently obtain the effect of improving the high-temperature cycle characteristics and the high-temperature storage characteristics of a non-aqueous electrolyte solution battery using the non-aqueous electrolyte solution. On the other hand, a concentration thereof exceeding 7.0% by mass is not preferable, because the excessive portion of the first compound not used in the formation of the coating films tends to generate gas and cause swelling and performance degradation of the battery because of decomposition reaction other than the coating film formation reaction. Within the range not exceeding 7.0% by mass, one of these first compounds may be used alone, or a mixture of two or more thereof may be used in any combination at any ratio according to the application.

A preferred concentration of the second compound is 0.005% by mass or higher, preferably 0.03% by mass or higher, and further preferably 0.7% by mass or higher, while the upper limit is 7.0% by mass or lower, preferably 5.5% by mass or lower, and further preferably 2.5% by mass or lower, relative to the total amount of the non-aqueous electrolyte solution. A concentration thereof lower than 0.005% by mass is not preferable, because it is difficult to sufficiently obtain the effect of improving the high-temperature cycle characteristics and the high-temperature storage characteristics of a non-aqueous electrolyte solution battery using the non-aqueous electrolyte solution. On the other hand, a concentration thereof exceeding 7.0% by mass is not preferable, because it is difficult to sufficiently obtain the effect of improving the high-temperature cycle characteristics and the high-temperature storage characteristics of a non-aqueous electrolyte solution battery using the non-aqueous electrolyte solution. Within the range not exceeding 7.0% by mass, one of these second compounds may be used alone, or a mixture of two or more thereof may be used in any combination at any ratio according to the application.

The first compounds represented by general formula (1) above include bis(oxalato)boric acid salts, difluoro(oxalato)boric acid salts, tris(oxalato)phosphoric acid salts, difluorobis(oxalato)phosphoric acid salts, tetrafluoro(oxalato)phosphoric acid salts, tris(oxalato)silicic acid salts, difluorobis(oxalato)silicic acid salts, tetrafluoro(malonato)phosphoric acid salts, difluoro(sulfoacetato)boric acid salts, difluoro(maleato) boric acid salt, and difluoro (fumarato) boric acid salt. Of these first compounds, the first compound is preferably at least one salt selected from the group consisting of bis(oxalato) boric acid salts, difluoro(oxalato)boric acid salts, tris(oxalato)phosphoric acid salts, difluorobis(oxalato)phosphoric acid salts, tetrafluoro(oxalato)phosphoric acid salts, and tetrafluoro(malonato)phosphoric acid salts, from the viewpoints of the solubility in an electrolyte solution and the thermal stability at high temperature. In addition, the counter cation ($A^{a+}$ in general formula (1) above) in the above-described compound is an alkali metal cation, an alkaline earth metal cation, or an onium cation, of which a lithium ion, a sodium ion, a potassium ion, a tetraalkylammonium ion, or a tetraalkylphosphonium ion is preferable, from the viewpoints of the solubility in an electrolyte solution and the ionic conductivity.

The groups having a carbon-carbon unsaturated bond and represented by $R^3$s in general formula (2) above include alkenyl groups having 2 to 8 carbon atoms, such as vinyl groups, allyl groups, 1-propenyl groups, isopropenyl groups, 2-butenyl groups, and 1,3-butadienyl groups, and alkenyloxy groups derived from these groups; alkynyl groups having 2 to 8 carbon atoms, such as ethynyl groups, 2-propynyl groups, and 1,1-dimethyl-2-propynyl groups, and alkynyloxy groups derived from these groups; and aryl groups having 6 to 12 carbon atoms, such as phenyl groups, tolyl groups, and xylyl groups, and aryloxy groups derived from these groups. In addition, the above-described groups may have fluorine atoms and oxygen atoms. Of these groups, groups having a carbon-carbon unsaturated bond and having 6 or less carbon atoms are preferable. If the number of carbon atoms is more than 6, the resistance achieved when a coating film is formed on an electrode tends to be relatively high. Specifically, groups selected from the group consisting of vinyl groups, allyl groups, 1-propenyl groups, ethynyl groups, and 2-propynyl groups are preferable.

Meanwhile, the alkyl groups and the alkoxy groups represented by $R^4$s in general formula (2) above include alkyl groups having 1 to 12 carbon atoms, such as methyl groups, ethyl groups, propyl groups, isopropyl groups, n-butyl groups, sec-butyl groups, isobutyl groups, tert-butyl groups, and pentyl groups, and alkoxy groups derived from these groups. The alkenyl groups and the alkenyloxy groups include alkenyl groups having 2 to 8 carbon atoms, such as vinyl groups, allyl groups, 1-propenyl groups, isopropenyl groups, 2-butenyl groups, and 1, 3-butadienyl groups, and alkenyloxy groups derived from these groups. The alkynyl groups and the alkynyloxy groups include alkynyl groups having 2 to 8 carbon atoms, such as ethynyl groups, 2-propynyl groups, and 1,1-dimethyl-2-propynyl groups, and alkynyloxy groups derived from these groups. The aryl groups and the aryloxy groups include aryl groups having 6 to 12 carbon atoms, such as phenyl groups, tolyl groups, and xylyl groups, or aryloxy groups derived from these groups. In addition, the above-described groups may have fluorine atoms and oxygen atoms. Groups represented by $R^4$s other than the above-described groups include fluorine atoms. Of these groups, groups selected from fluorine atoms, alkyl groups, and alkoxy groups have a tendency that the resistance achieved when a coating film is formed on an electrode is lower, and hence are preferable from the viewpoint of the resultant output characteristics. Especially, groups selected from the group consisting of fluorine atoms, methyl groups, ethyl groups, propyl groups, 2,2,2-trifluoroethyl groups, 2,2,3,3-tetrafluoropropyl groups, 1,1,1-trifluoroisopropyl groups, 1,1,1,3,3,3-hexafluoroisopropyl groups, 2,2,2-trifluoroethoxy groups, 2,2,3,3-tetrafluoropropoxy groups, 2,2,3,3,3-pentafluoropropoxy groups, 1,1,1-trifluoroisopropoxy groups, and 1,1,1,3,3,3-hexafluoroisopropoxy groups are preferable, because a non-aqueous electrolyte solution battery having better high-temperature cycle characteristics and better high-temperature storage characteristics can be obtained without increasing the above-described resistance.

More specifically, examples of the second compounds represented by general formula (2) above include the following compounds No. 1 to No. 25, and the like. However, the second compounds used in the present invention are not limited to the following examples at all.

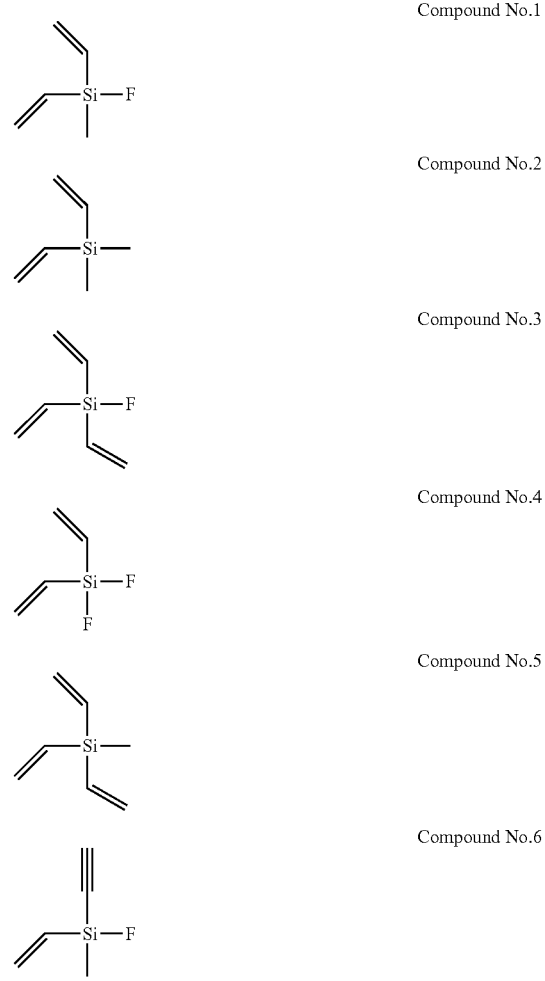

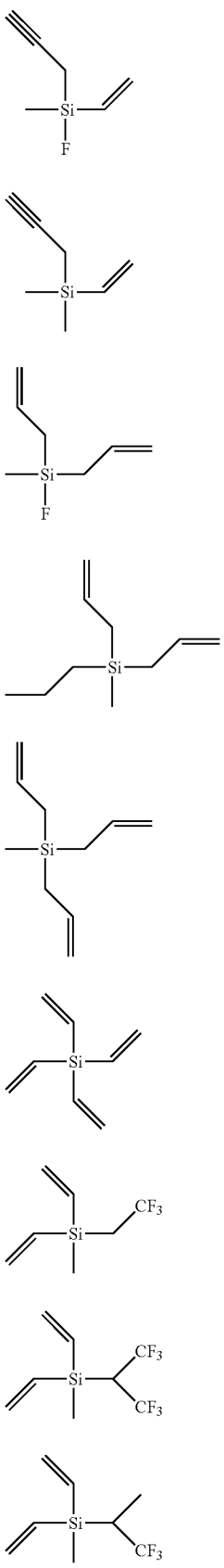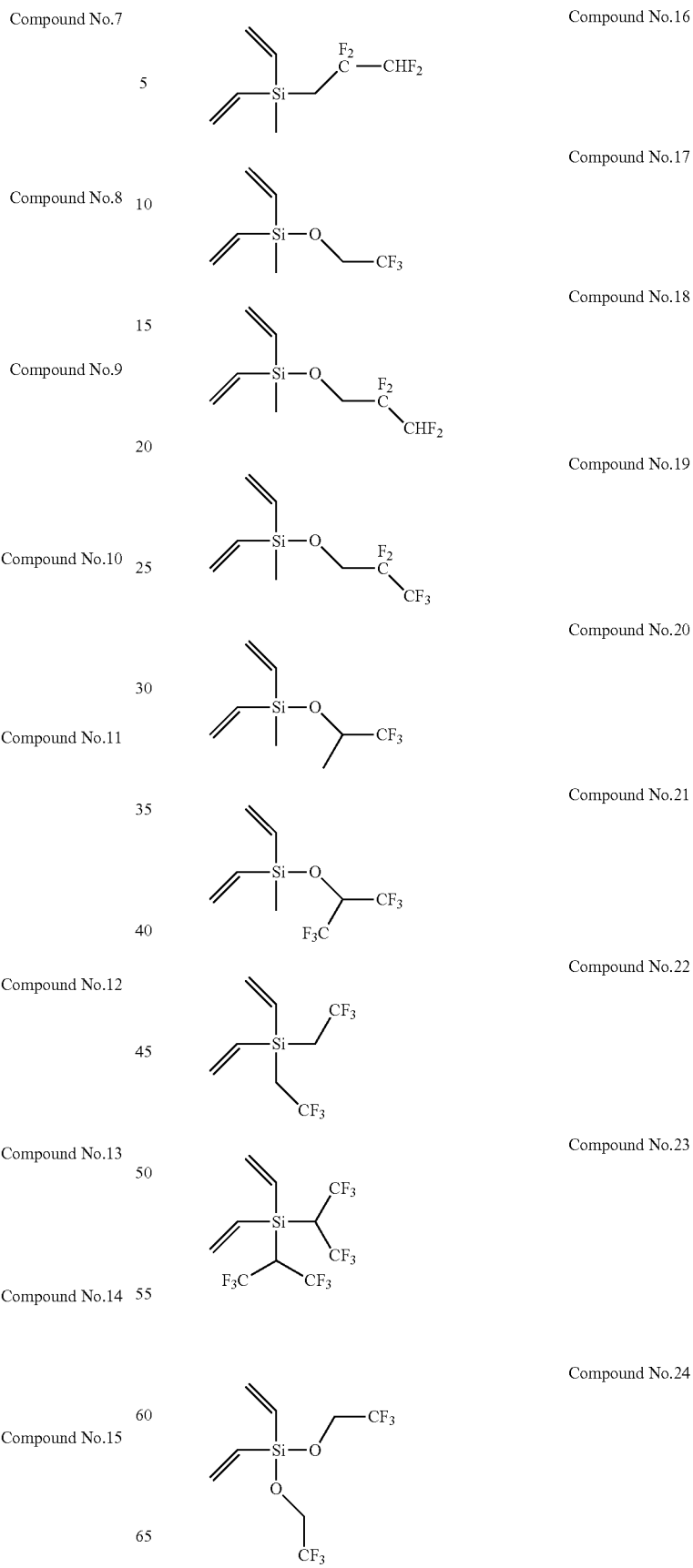

-continued

Compound No.25

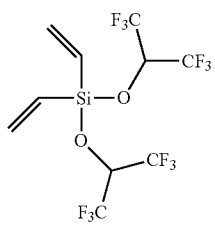

The type of the non-aqueous solvent used in the electrolyte solution for a non-aqueous electrolyte solution battery of the present invention is not particularly limited, and any non-aqueous solvent can be used. Specific examples include cyclic carbonates such as propylene carbonate, ethylene carbonate, and butylene carbonate; open-chain carbonates such as diethyl carbonate, dimethyl carbonate, and ethyl methyl carbonate; cyclic esters such as γ-butyrolactone and γ-valerolactone; open-chain esters such as methyl acetate and methyl propionate; cyclic ethers such as tetrahydrofuran, 2-methyltetrahydrofuran, and dioxane; open-chain ethers such as dimethoxyethane and diethyl ether; sulfone compounds and sulfoxide compounds such as dimethyl sulfoxide and sulfolane; and the like. In addition, although belonging to a category different from non-aqueous solvents, ionic liquids and the like are also included. In addition, regarding the non-aqueous solvents used in the present invention, one of the non-aqueous solvents may be used alone, or a mixture of two or more thereof may be used in any combination at any ratio according to the application. Of these non-aqueous solvents, propylene carbonate, ethylene carbonate, diethyl carbonate, dimethyl carbonate, and ethyl methyl carbonate are particularly preferable, from the viewpoints of their electrochemical stability against oxidation and reduction and their chemical stability relating to thermal reaction and reaction with the solute.

The types of the solute used in the electrolyte solution for a non-aqueous electrolyte solution battery of the present invention is not particularly limited, but any electrolyte salt can be used. Specific examples include electrolyte salts typified by $LiPF_6$, $LiBF_4$, $LiClO_4$, $LiAsF_6$, $LiSbF_6$, $LiCF_3SO_3$, $LiN(CF_3SO_2)_2$, $LiN(FSO_2)_2$, $LiN(POF_2)_2$, $LiN(C_2F_5SO_2)_2$, $LiN(CF_3SO_2)(C_4F_9SO_2)$, $LiC(CF_3SO_2)_3$, $LiPF_3(C_3F_7)_3$, $LiB(CF_3)_4$, $LiBF_3(C_2F_5)$, $LiPO_2F_2$, and the like for lithium batteries and lithium ion batteries, and electrolyte salts typified by $NaPF_6$, $NaBF_4$, $NaCF_3SO_3$, $NaN(CF_3SO_2)_2$, $NaN(FSO_2)_2$, $NaN(F_2PO)_2$, and the like for sodium ion batteries. One of these solutes may be used alone, or a mixture of two or more thereof may be used in any combination at any ratio according to the application. Of these solutes, $LiPF_6$, $LiBF_4$, $LiN(CF_3SO_2)_2$, $LiN(FSO_2)_2$, $LiN(POF_2)_2$, $LiN(C_2F_5SO_2)_2$, $LiPO_2F_2$, $NaPF_6$, $NaN(CF_3SO_2)_2$, $NaN(FSO_2)_2$, and $NaN(F_2PO)_2$ are preferable, considering the energy density, the output characteristics, the service life, and the like of the battery.

The concentration of the solute is not particularly limited. Preferably, the range is such that the lower limit is 0.5 mol/L or higher, more preferably 0.7 mol/L or higher, and further preferably 0.9 mol/L or higher, whereas the upper limit is 2.5 mol/L or lower, more preferably 2.0 mol/L or lower, and further preferably 1.5 mol/L or lower. If the concentration is lower than 0.5 mol/L, the cycle characteristics and the output characteristics of the non-aqueous electrolyte solution battery tend to deteriorate because of decrease in ionic conductivity. Meanwhile, if the concentration exceeds 2.5 mol/L, the increase in viscosity of the electrolyte solution for a non-aqueous electrolyte solution battery tends to also lower the ionic conductivity, which may deteriorate the cycle characteristics and the output characteristics of the non-aqueous electrolyte solution battery.

When a large amount of the solute is dissolved in the non-aqueous solvent at once, the liquid temperature may rise because of the heat of dissolution of the solute. If the liquid temperature rises remarkably, the decomposition of the fluorine-containing electrolyte salt is promoted, which may results in the formation of hydrogen fluoride. Hydrogen fluoride is not preferable, because it causes deterioration of the performance of the battery. For this reason, the liquid temperature at which the solute is dissolved in the non-aqueous solvent is preferably −20 to 80° C., and more preferably 0 to 60° C., although the liquid temperature is not particularly limited.

The basic configuration of the electrolyte solution for a non-aqueous electrolyte solution battery of the present invention is described above; however, ordinary used additives may be added at any ratio to the electrolyte solution for a non-aqueous electrolyte solution battery of the present invention, as long as the gist of the present invention is impaired. Specific examples include compounds having an overcharge prevention effect, a negative electrode coating film formation effect, or a positive electrode protection effect, such as cyclohexylbenzene, biphenyl, t-butylbenzene, vinylene carbonate, vinylethylene carbonate, difluoroanisole, fluoroethylene carbonate, propanesultone, succinonitrile, and dimethylvinylene carbonate. In addition, the electrolyte solution for a non-aqueous electrolyte solution battery can also be used after being transformed into a quasi-solid state with a gelling agent or a cross-linked polymer as in the case of the use for a non-aqueous electrolyte solution battery called a lithium polymer battery.

Next, a configuration of a non-aqueous electrolyte solution battery of the present invention is described. The non-aqueous electrolyte solution battery of the present invention is characterized by the use of the above-described electrolyte solution for a non-aqueous electrolyte solution battery of the present invention, and the other constituent members used are those used for ordinary non-aqueous electrolyte solution batteries. Specifically, the non-aqueous electrolyte solution battery of the present invention comprises a positive electrode and a negative electrode capable of storing and releasing cations, a current collector, a separator, a container, and the like.

The negative electrode material is not particularly limited, and in the case of a lithium battery or a lithium ion battery, the negative electrode material used is lithium metal, an alloy of lithium metal with another metal, an intermetallic compound, any of various carbon materials (artificial graphite, naturally occurring graphite, and the like), a metal oxide, a metal nitride, tin (simple substance), a tin compound, silicon (simple substance), a silicon compound, activated carbon, a conducting polymer, or the like.

Examples of the carbon materials include graphitizable carbon, non-graphitizable carbon (hard carbon) with a (002) inter planar spacing of 0.37 nm or more, graphite with a (002) inter planar spacing of 0.34 nm or less, and the like. More specific examples include pyrolytic carbon, coke, glassy carbon fiber, calcined organic polymer compounds, activated carbon, carbon black, and the like. Specifically, the coke includes pitch coke, needle coke, petroleum coke, and the like. The calcined organic polymer compounds are those obtained by calcining phenolic resin, furan resin, or the like at a suitable temperature into carbon. A carbon material is preferable, because it undergoes very small change in crystal structure associated with the storage and release of lithium, so that a high energy density can be obtained and excellent cycle characteristics can be obtained. Note that the form of the carbon material may be any one of a fibrous form, a spherical form, a particulate form, or a flaky form. In addition, amorphous carbon and a graphite material having a surface covered with amorphous carbon are more preferable, because the reactivity of the surface of the material with the electrolyte solution is low.

The positive electrode material is not particularly limited, and examples of the positive electrode material used in the case of a lithium battery or a lithium ion battery include lithium-containing transition metal composite oxides such as $LiCoO_2$, $LiNiO_2$, $LiMnO_2$, and $LiMn_2O_4$; materials which are the same as the lithium-containing transition metal composite oxides, except that multiple transition metals such as Co, Mn, and Ni are mixed therein; materials which are the same as the lithium-containing transition metal composite oxides, except that the transition metals therein are partially replaced with a metal other than transition metals; transition metal phosphate compounds called olivine, such as $LiFePO_4$, $LiCoPO_4$, and $LiMnPO_4$; oxides such as $TiO_2$, $V_2O_5$, and $MoO_3$; sulfides such as $TiS_2$ and FeS; electrically conductive polymers such as polyacetylene, poly(para-phenylene), polyaniline, and polypyrrole; activated carbon; radical-generating polymers; carbon materials; and the like.

An electrode sheet can be formed by adding a conductive material such as acetylene black, Ketjenblack, carbon fiber, or graphite, and a binder such as polytetrafluoroethylene, polyvinylidene fluoride, SBR resin, or the like to the positive or negative electrode material, and shaping the mixture into a sheet.

As a separator for preventing the contact between the positive electrode and the negative electrode, a nonwoven fabric or porous sheet made of polypropylene, polyethylene, paper, glass fiber, or the like is used.

The above-described elements are assembled into a non-aqueous electrolyte solution battery having a shape, such as a coin shape, a tubular shape, a square shape, or an aluminum laminate sheet type.

EXAMPLES

Hereinafter, the present invention is described specifically based on Examples; however, the present invention is not limited to such Examples.
[Preparation of Non-Aqueous Electrolyte Solution]

Electrolyte Solution No. 1 was prepared by using a mixture solvent of ethylene carbonate, propylene carbonate, dimethyl carbonate, and ethyl methyl carbonate at a volume ratio of 2:1:3:4 as a non-aqueous solvent and by dissolving, in the solvent, $LiPF_6$ at a concentration of 1.0 mol/L as a solute, lithium difluoro (bis(oxalato))phosphate at a concentration of 1.0% by mass as a first compound, and Compound No. 1 described above at a concentration of 0.01% by mass as a second compound. Note that the above-described preparation was carried out, while the liquid temperature was kept at 25° C. Table 1 shows the preparation conditions of Electrolyte Solution No. 1.

In addition, Electrolyte Solutions No. 2 to 80 were prepared in the same manner as described above, except that the type and concentration of the first compound and the type and concentration of the second compound were changed as shown in Table 1. Note that Compounds No. 26 to 29 used as the second compounds for the preparation of Electrolyte Solutions No. 66 to 69 are shown below.

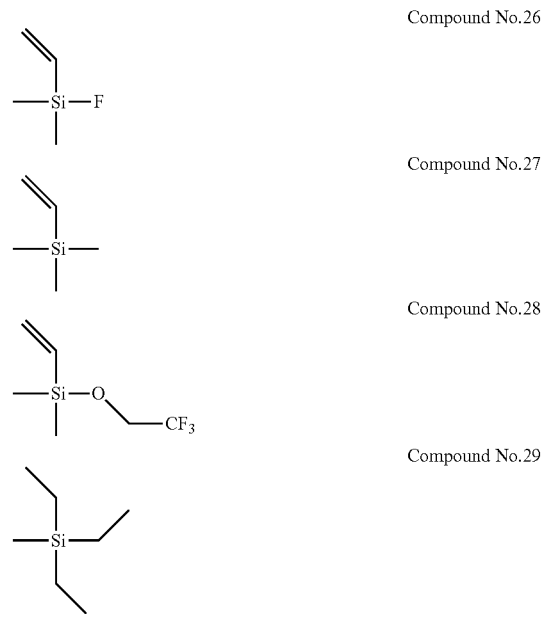

Example 1-1

A cell was fabricated by using Electrolyte Solution No. 1 as a non-aqueous electrolyte solution, $LiCoO_2$ as a positive electrode material, and graphite as a negative electrode material, and the battery was actually evaluated for high-temperature cycle characteristics and high-temperature storage characteristics. The test cell was fabricated as follows.

A paste was obtained by mixing 90% by mass of $LiCoO_2$ powder with 5% by mass of polyvinylidene fluoride (PVDF) as a binder and 5% by mass of acetylene black as a conductive material, and further adding N-methylpyrrolidone. This paste was applied onto aluminum foil, and dried. Thus, a positive electrode member for test was obtained. Meanwhile, a slurry was obtained by mixing 90% by mass of graphite powder with 10% by mass of polyvinylidene fluoride (PVDF) as a binder, and further adding N-methylpyrrolidone thereto. This slurry was applied onto copper foil, and dried at 150° C. for 12 hours. Thus, a negative electrode member for test was obtained. Then, a polyethylene separator was impregnated with the electrolyte solution, and a 50 mAh cell with an aluminum laminate outer packaging was assembled.

By using the cell fabricated by the method as described above, a charge-discharge test was conducted, and the high-temperature cycle characteristics and the high-temperature storage characteristics were evaluated by the methods described below. Table 2 shows the evaluation results.
[High-Temperature Cycle Characteristics Test]

The cycle characteristics were evaluated by conducting a charge-discharge test at an ambient temperature of 60° C. Charge-discharge cycles were repeated in which the cell was charged to 4.2V and discharged to 3.0 V with a current density of 1.9 $mA/cm^2$. Then, the degree of degradation of the cell was evaluated based on the service capacity retention ratio after 500 cycles (cycle characteristics evaluation). The service capacity retention ratio was determined by using the following formula.

<Service Capacity Retention Ratio after 500 Cycles>

Service Capacity Retention Ratio (%)=(Service Capacity after 500 Cycles/Initial Service Capacity)×100

Note that, regarding the numeric values of the service capacity retention ratio after 500 cycles shown in Table 2, the numeric values of Examples 1-1 to 1-39 are relative values, where the service capacity retention ratio after 500 cycles shown in Comparative Example 1-1 is taken as 100. Meanwhile, the numeric values of the service capacity retention ratio after 500 cycles shown in Examples 1-40 to 1-44 are relative values, where the service capacity retention ratio after 500 cycles shown in Comparative Example 1-6 is taken as 100. The numeric values of the service capacity retention ratio after 500 cycles shown in Examples 1-45 to 1-49 are relative values, where the service capacity retention ratio after 500 cycles of Comparative Example 1-7 is taken as 100. The numeric values of the service capacity retention ratio after 500 cycles shown in Examples 1-50 to 1-54 are relative values, where the service capacity retention ratio after 500 cycles of Comparative Example 1-8 is taken as 100. The numeric values of the service capacity retention ratio after 500 cycles shown in Examples 1-55 to 1-59 are relative values, where the service capacity retention ratio after 500 cycles of Comparative Example 1-9 is taken as 100. The numeric values of the service capacity retention ratio after 500 cycles shown in Examples 1-60 to 1-64 are relative values, where the service capacity retention ratio after 500 cycles of Comparative Example 1-10 is taken as 100. The numeric values of the service capacity retention ratio after 500 cycles shown in Comparative Examples 1-11 to 1-16 are relative values, where the service capacity retention ratio after 500 cycles of Comparative Example 1-1 is taken as 100.

[High-Temperature Storage Characteristics Test]

After the above-described cycle test, the cell was charged to an upper limit charge voltage of 4.2 V at an ambient temperature of 25° C. by a constant current-constant voltage method with a current density of 0.38 mA/cm$^2$, and then the cell was stored at an ambient temperature of 60° C. for 10 days. After that, the cell was discharged to a final discharge voltage of 3.0 V by a constant current with a current density of 0.38 mA/cm$^2$. The ratio of this service capacity to the initial service capacity (the service capacity measured after the cycle test but before the storage at 60° C.) was taken as the remaining capacity ratio, and used for evaluation of the storage characteristics of the cell. Note that, regarding the numeric values of the remaining capacity ratio shown in Table 2, the numeric values of Examples 1-1 to 1-39 are relative values, where the remaining capacity ratio of Comparative Example 1-1 is taken as 100. The numeric value of the remaining capacity ratio shown in Examples 1-40 to 1-44 are relative values, where the remaining capacity ratio of Comparative Example 1-6 is taken as 100. The numeric value of the remaining capacity ratio shown in Examples 1-45 to 1-49 are relative values, where the remaining capacity ratio of Comparative Example 1-7 is taken as 100. The numeric value of the remaining capacity ratio shown in Examples 1-50 to 1-54 are relative values, where the remaining capacity ratio of Comparative Example 1-8 is taken as 100. The numeric value of the remaining capacity ratio shown in Examples 1-55 to 1-59 are relative values, where the remaining capacity ratio of Comparative Example 1-9 is taken as 100. The numeric value of the remaining capacity ratio shown in Examples 1-60 to 1-64 are relative values, where the remaining capacity ratio of Comparative Example 1-10 is taken as 100. The numeric values of the remaining capacity ratio shown in Comparative Examples 1-11 to 1-16 are relative values, where the remaining capacity ratio of Comparative Example 1-1 is taken as 100.

Examples 1-2 to 1-64 and Comparative Examples 1-1 to 1-16

Cells which were the same as that in Example 1-1 were each fabricated by using the corresponding one of Electrolyte Solutions No. 2 to 80 instead of Electrolyte Solution No. 1, and the high-temperature cycle characteristics and the high-temperature storage characteristics were evaluated in the same manner. Table 2 shows the evaluation results.

TABLE 1

| | First compound | | Second compound | |
| --- | --- | --- | --- | --- |
| | Name of compound | Conc. (% by mass) | Comp. No. | Conc. (% by mass) |
| Electrolyte Solution No. 1 | Lithium difluorobis(oxalato)phosphate | 1.0 | No. 1 | 0.01 |
| Electrolyte Solution No. 2 | | 1.0 | | 0.05 |
| Electrolyte Solution No. 3 | | 1.0 | | 0.1 |
| Electrolyte Solution No. 4 | | 1.0 | | 0.5 |
| Electrolyte Solution No. 5 | | 1.0 | | 1.0 |
| Electrolyte Solution No. 6 | | 1.0 | | 2.0 |
| Electrolyte Solution No. 7 | | 1.0 | | 3.0 |
| Electrolyte Solution No. 8 | | 1.0 | | 5.0 |
| Electrolyte Solution No. 9 | | 1.0 | | 6.0 |
| Electrolyte Solution No. 10 | | 0.1 | | 0.5 |
| Electrolyte Solution No. 11 | | 0.5 | | 0.5 |
| Electrolyte Solution No. 12 | | 2.0 | | 0.5 |
| Electrolyte Solution No. 13 | | 3.0 | | 0.5 |
| Electrolyte Solution No. 14 | | 4.0 | | 0.5 |
| Electrolyte Solution No. 15 | | 5.0 | | 0.5 |
| Electrolyte Solution No. 16 | | 1.0 | No. 2 | 0.5 |
| Electrolyte Solution No. 17 | | 1.0 | No. 3 | 0.5 |
| Electrolyte Solution No. 18 | | 1.0 | No. 4 | 0.5 |
| Electrolyte Solution No. 19 | | 1.0 | No. 5 | 0.5 |
| Electrolyte Solution No. 20 | | 1.0 | No. 6 | 0.5 |
| Electrolyte Solution No. 21 | | 1.0 | No. 7 | 0.5 |
| Electrolyte Solution No. 22 | | 1.0 | No. 8 | 0.5 |
| Electrolyte Solution No. 23 | | 1.0 | No. 9 | 0.5 |
| Electrolyte Solution No. 24 | | 1.0 | No. 10 | 0.5 |

TABLE 1-continued

|  | First compound |  | Second compound |  |
|---|---|---|---|---|
|  | Name of compound | Conc. (% by mass) | Comp. No. | Conc. (% by mass) |
| Electrolyte Solution No. 25 |  | 1.0 | No. 11 | 0.5 |
| Electrolyte Solution No. 26 |  | 1.0 | No. 12 | 0.5 |
| Electrolyte Solution No. 27 |  | 1.0 | No. 13 | 0.5 |
| Electrolyte Solution No. 28 |  | 1.0 | No. 14 | 0.5 |
| Electrolyte Solution No. 29 |  | 1.0 | No. 15 | 0.5 |
| Electrolyte Solution No. 30 |  | 1.0 | No. 16 | 0.5 |
| Electrolyte Solution No. 31 |  | 1.0 | No. 17 | 0.5 |
| Electrolyte Solution No. 32 |  | 1.0 | No. 18 | 0.5 |
| Electrolyte Solution No. 33 |  | 1.0 | No. 19 | 0.5 |
| Electrolyte Solution No. 34 |  | 1.0 | No. 20 | 0.5 |
| Electrolyte Solution No. 35 |  | 1.0 | No. 21 | 0.5 |
| Electrolyte Solution No. 36 |  | 1.0 | No. 22 | 0.5 |
| Electrolyte Solution No. 37 |  | 1.0 | No. 23 | 0.5 |
| Electrolyte Solution No. 38 |  | 1.0 | No. 24 | 0.5 |
| Electrolyte Solution No. 39 |  | 1.0 | No. 25 | 0.5 |
| Electrolyte Solution No. 40 | Lithium | 1.0 | No. 1 | 0.5 |
| Electrolyte Solution No. 41 | tetrafluoro(oxalato)phosphate | 1.0 | No. 2 | 0.5 |
| Electrolyte Solution No. 42 |  | 1.0 | No. 4 | 0.5 |
| Electrolyte Solution No. 43 |  | 1.0 | No. 5 | 0.5 |
| Electrolyte Solution No. 44 |  | 1.0 | No. 12 | 0.5 |
| Electrolyte Solution No. 45 | Lithium tris(oxalato)phosphate | 1.0 | No. 1 | 0.5 |
| Electrolyte Solution No. 46 |  | 1.0 | No. 2 | 0.5 |
| Electrolyte Solution No. 47 |  | 1.0 | No. 4 | 0.5 |
| Electrolyte Solution No. 48 |  | 1.0 | No. 5 | 0.5 |
| Electrolyte Solution No. 49 |  | 1.0 | No. 12 | 0.5 |
| Electrolyte Solution No. 50 | Lithium difluoro(oxalato)borate | 1.0 | No. 1 | 0.5 |
| Electrolyte Solution No. 51 |  | 1.0 | No. 2 | 0.5 |
| Electrolyte Solution No. 52 |  | 1.0 | No. 4 | 0.5 |
| Electrolyte Solution No. 53 |  | 1.0 | No. 5 | 0.5 |
| Electrolyte Solution No. 54 |  | 1.0 | No. 12 | 0.5 |
| Electrolyte Solution No. 55 | Lithium bis(oxalato)borate | 1.0 | No. 1 | 0.5 |
| Electrolyte Solution No. 56 |  | 1.0 | No. 2 | 0.5 |
| Electrolyte Solution No. 57 |  | 1.0 | No. 4 | 0.5 |
| Electrolyte Solution No. 58 |  | 1.0 | No. 5 | 0.5 |
| Electrolyte Solution No. 59 |  | 1.0 | No. 12 | 0.5 |
| Electrolyte Solution No. 60 | Lithium | 1.0 | No. 1 | 0.5 |
| Electrolyte Solution No. 61 | tetrafluoro(malonato)phosphate | 1.0 | No. 2 | 0.5 |
| Electrolyte Solution No. 62 |  | 1.0 | No. 4 | 0.5 |
| Electrolyte Solution No. 63 |  | 1.0 | No. 5 | 0.5 |
| Electrolyte Solution No. 64 |  | 1.0 | No. 12 | 0.5 |
| Electrolyte Solution No. 65 | Lithium | 1.0 | None | 0 |
| Electrolyte Solution No. 66 | difluorobis(oxalato)phosphate | 1.0 | No. 26 | 0.5 |
| Electrolyte Solution No. 67 |  | 1.0 | No. 27 | 0.5 |
| Electrolyte Solution No. 68 |  | 1.0 | No. 28 | 0.5 |
| Electrolyte Solution No. 69 |  | 1.0 | No. 29 | 0.5 |
| Electrolyte Solution No. 70 | Lithium tetrafluoro(oxalato)phosphate | 1.0 | None | 0 |
| Electrolyte Solution No. 71 | lithium tris(oxalato)phosphate | 1.0 | None | 0 |
| Electrolyte Solution No. 72 | Lithium difluoro(oxalato)borate | 1.0 | None | 0 |
| Electrolyte Solution No. 73 | Lithium bis(oxalato)borate | 1.0 | None | 0 |
| Electrolyte Solution No. 74 | Lithium tetrafluoro(malonato)phosphate | 1.0 | None | 0 |
| Electrolyte Solution No. 75 | None | 0 | No. 1 | 0.5 |
| Electrolyte Solution No. 76 |  | 0 | No. 2 | 0.5 |
| Electrolyte Solution No. 77 |  | 0 | No. 4 | 0.5 |
| Electrolyte Solution No. 78 |  | 0 | No. 5 | 0.5 |
| Electrolyte Solution No. 79 |  | 0 | No. 12 | 0.5 |
| Electrolyte Solution No. 80 |  | 0 | None | 0 |

TABLE 2

|  | Electrolyte solution No. | Active material of positive electrode | Active material of negative electrode | Service capacity retention ratio after 500 cycles* | Remaining capacity ratio* |
|---|---|---|---|---|---|
| Ex. 1-1 | No. 1 | LiCoO$_2$ | Graphite | 102 | 103 |
| Ex. 1-2 | No. 2 |  |  | 103 | 105 |
| Ex. 1-3 | No. 3 |  |  | 105 | 108 |
| Ex. 1-4 | No. 4 |  |  | 110 | 113 |
| Ex. 1-5 | No. 5 |  |  | 112 | 115 |

TABLE 2-continued

| | Electrolyte solution No. | Active material of positive electrode | Active material of negative electrode | Service capacity retention ratio after 500 cycles* | Remaining capacity ratio* |
|---|---|---|---|---|---|
| Ex. 1-6 | No. 6 | | | 112 | 117 |
| Ex. 1-7 | No. 7 | | | 111 | 116 |
| Ex. 1-8 | No. 8 | | | 109 | 113 |
| Ex. 1-9 | No. 9 | | | 106 | 110 |
| Ex. 1-10 | No. 10 | | | 104 | 105 |
| Ex. 1-11 | No. 11 | | | 108 | 110 |
| Ex. 1-12 | No. 12 | | | 113 | 114 |
| Ex. 1-13 | No. 13 | | | 111 | 114 |
| Ex. 1-14 | No. 14 | | | 110 | 113 |
| Ex. 1-15 | No. 15 | | | 107 | 110 |
| Ex. 1-16 | No. 16 | | | 105 | 107 |
| Ex. 1-17 | No. 17 | | | 113 | 115 |
| Ex. 1-18 | No. 18 | | | 109 | 111 |
| Ex. 1-19 | No. 19 | | | 106 | 107 |
| Ex. 1-20 | No. 20 | | | 111 | 117 |
| Ex. 1-21 | No. 21 | | | 110 | 112 |
| Ex. 1-22 | No. 22 | | | 105 | 106 |
| Ex. 1-23 | No. 23 | | | 108 | 111 |
| Ex. 1-24 | No. 24 | | | 103 | 105 |
| Ex. 1-25 | No. 25 | | | 104 | 107 |
| Ex. 1-26 | No. 26 | | | 106 | 109 |
| Ex. 1-27 | No. 27 | | | 108 | 111 |
| Ex. 1-28 | No. 28 | | | 108 | 110 |
| Ex. 1-29 | No. 29 | | | 107 | 108 |
| Ex. 1-30 | No. 30 | | | 107 | 109 |
| Ex. 1-31 | No. 31 | | | 105 | 106 |
| Ex. 1-32 | No. 32 | | | 104 | 105 |
| Ex. 1-33 | No. 33 | | | 104 | 106 |
| Ex. 1-34 | No. 34 | | | 105 | 106 |
| Ex. 1-35 | No. 35 | | | 106 | 108 |
| Ex. 1-36 | No. 36 | | | 108 | 110 |
| Ex. 1-37 | No. 37 | | | 110 | 111 |
| Ex. 1-38 | No. 38 | | | 108 | 109 |
| Ex. 1-39 | No. 39 | | | 109 | 109 |
| Ex. 1-40 | No. 40 | | | 108 | 111 |
| Ex. 1-41 | No. 41 | | | 104 | 105 |
| Ex. 1-42 | No. 42 | | | 107 | 110 |
| Ex. 1-43 | No. 43 | | | 105 | 104 |
| Ex. 1-44 | No. 44 | | | 106 | 105 |
| Ex. 1-45 | No. 45 | | | 108 | 110 |
| Ex. 1-46 | No. 46 | | | 105 | 104 |
| Ex. 1-47 | No. 47 | | | 108 | 108 |
| Ex. 1-48 | No. 48 | | | 105 | 105 |
| Ex. 1-49 | No. 49 | | | 106 | 106 |
| Ex. 1-50 | No. 50 | | | 110 | 114 |
| Ex. 1-51 | No. 51 | | | 106 | 107 |
| Ex. 1-52 | No. 52 | | | 109 | 110 |
| Ex. 1-53 | No. 53 | | | 107 | 108 |
| Ex. 1-54 | No. 54 | | | 106 | 110 |
| Ex. 1-55 | No. 55 | | | 105 | 108 |
| Ex. 1-56 | No. 56 | | | 103 | 103 |
| Ex. 1-57 | No. 57 | | | 105 | 105 |
| Ex. 1-58 | No. 58 | | | 102 | 104 |
| Ex. 1-59 | No. 59 | | | 103 | 105 |
| Ex. 1-60 | No. 60 | | | 109 | 110 |
| Ex. 1-61 | No. 61 | | | 105 | 105 |
| Ex. 1-62 | No. 62 | | | 107 | 109 |
| Ex. 1-63 | No. 63 | | | 105 | 105 |
| Ex. 1-64 | No. 64 | | | 106 | 107 |
| Comp. Ex. 1-1 | No. 65 | | | 100 | 100 |
| Comp. Ex. 1-2 | No. 66 | | | 99 | 98 |
| Comp. Ex. 1-3 | No. 67 | | | 99 | 99 |
| Comp. Ex. 1-4 | No. 68 | | | 97 | 98 |
| Comp. Ex. 1-5 | No. 69 | | | 100 | 98 |
| Comp. Ex. 1-6 | No. 70 | | | 100 | 100 |
| Comp. Ex. 1-7 | No. 71 | | | 100 | 100 |
| Comp. Ex. 1-8 | No. 72 | | | 100 | 100 |
| Comp. Ex. 1-9 | No. 73 | | | 100 | 100 |
| Comp. Ex. 1-10 | No. 74 | | | 100 | 100 |

TABLE 2-continued

|  | Electrolyte solution No. | Active material of positive electrode | Active material of negative electrode | Service capacity retention ratio after 500 cycles* | Remaining capacity ratio* |
|---|---|---|---|---|---|
| Comp. Ex. 1-11 | No. 75 |  |  | 82 | 74 |
| Comp. Ex. 1-12 | No. 76 |  |  | 81 | 72 |
| Comp. Ex. 1-13 | No. 77 |  |  | 82 | 74 |
| Comp. Ex. 1-14 | No. 78 |  |  | 79 | 73 |
| Comp. Ex. 1-15 | No. 79 |  |  | 80 | 73 |
| Comp. Ex. 1-16 | No. 80 |  |  | 82 | 75 |

*The values of Examples 1-1 to 1-39 are relative values, where the values of Comparative Example 1-1 are taken as 100. The values of Examples 1-40 to 1-44 are relative values, where the values of Comparative Example 1-6 are taken as 100. The values of Examples 1-45 to 1-49 are relative values, where the values of Comparative Example 1-7 are taken as 100. The values of Examples 1-50 to 1-54 are relative values, where the values of Comparative Example 1-8 are taken as 100. The values of Examples 1-55 to 1-59 are relative values, where the values of Comparative Example 1-9 are taken as 100. The values of Examples 1-60 to 1-64 are relative values, where the values of Comparative Example 1-10 are taken as 100. The values of Comparative Examples 1-11 to 1-16 are relative values, where the values of Comparative Example 1-1 are taken as 100.

A comparison of the above-described results showed that the use of the first compound and the second compound in combination resulted in improved high-temperature cycle characteristics and improved high-temperature storage characteristics in comparison with Comparative Examples 1-1 and 1-6 to 1-10, where the first compound was used alone. Likewise, it was also shown that the high-temperature cycle characteristics and the high-temperature storage characteristics were improved in comparison with Comparative Examples 1-11 to 1-16, where the second compound was used alone.

Moreover, when the number of the groups having a carbon-carbon unsaturated bond in the second compound was 1 or less as in Comparative Examples 1-2 to 1-5, no improvement in high-temperature cycle characteristics or high-temperature storage characteristics was observed.

Next, in Examples 1-4 and 1-16 to 1-64, i.e., in the systems, where the types of the first and second compounds were changed, while the concentration of the first compound was fixed to 1.0% by mass, and the concentration of the second compound was fixed to 0.5% by mass, the output characteristics of the batteries were evaluated by the method described below. Table 3 shows the evaluation results.

[Output Characteristics Test]

After the above-described high-temperature storage test, each cell was charged and discharged at an ambient temperature of 60° C. with an upper limit charge voltage of 4.2 V by a constant current-constant voltage method with a current density of 0.38 mA/cm². The service capacity here was taken as service capacity A. After that, the cell was charged to an upper limit charge voltage of 4.2 V by a constant current-constant voltage method with a current density of 0.38 mA/cm², and then discharged to a final discharge voltage of 3.0 V by a constant current with a current density of 9.5 mA/cm². The service capacity here was taken as service capacity B. The value obtained by dividing the "service capacity B" by the "service capacity A" was taken as a high-power capacity retention ratio, which was used to evaluate the output characteristics of the cell. Note that the numeric values of the high-power capacity retention ratio shown in Examples 1-4 and 1-16 to 1-39 in Table 3 are relative values, where the high-power capacity retention ratio of Example 1-26 is taken as 100. The numeric values of the high-power capacity retention ratio shown in Examples 1-40 to 1-44 are relative values, where the high-power capacity retention ratio of Example 1-44 is taken as 100. The numeric values of the high-power capacity retention ratio shown in Examples 1-45 to 1-49 are relative values, where the high-power capacity retention ratio of Example 1-49 is taken as 100. The numeric values of the high-power capacity retention ratio shown in Examples 1-50 to 1-54 are relative values, where the high-power capacity retention ratio of Example 1-54 is taken as 100. The numeric values of the high-power capacity retention ratio shown in Examples 1-55 to 1-59 are relative values, where the high-power capacity retention ratio of Example 1-59 is taken as 100. The numeric values of the high-power capacity retention ratio shown in Examples 1-60 to 1-64 are relative values, where the high-power capacity retention ratio of Example 1-64 is taken as 100.

TABLE 3

|  | Electrolyte solution No. | Active material of positive electrode | Active material of negative electrode | High-power capacity retention ratio* |
|---|---|---|---|---|
| Ex. 1-4 | No. 4 | LiCoO₂ | Graphite | 110 |
| Ex. 1-16 | No. 16 |  |  | 116 |
| Ex. 1-17 | No. 17 |  |  | 103 |
| Ex. 1-18 | No. 18 |  |  | 108 |
| Ex. 1-19 | No. 19 |  |  | 112 |
| Ex. 1-20 | No. 20 |  |  | 113 |
| Ex. 1-21 | No. 21 |  |  | 107 |
| Ex. 1-22 | No. 22 |  |  | 115 |
| Ex. 1-23 | No. 23 |  |  | 106 |
| Ex. 1-24 | No. 24 |  |  | 114 |
| Ex. 1-25 | No. 25 |  |  | 113 |
| Ex. 1-26 | No. 26 |  |  | 100 |
| Ex. 1-27 | No. 27 |  |  | 108 |
| Ex. 1-28 | No. 28 |  |  | 105 |
| Ex. 1-29 | No. 29 |  |  | 112 |
| Ex. 1-30 | No. 30 |  |  | 103 |
| Ex. 1-31 | No. 31 |  |  | 111 |
| Ex. 1-32 | No. 32 |  |  | 110 |
| Ex. 1-33 | No. 33 |  |  | 114 |
| Ex. 1-34 | No. 34 |  |  | 117 |
| Ex. 1-35 | No. 35 |  |  | 110 |
| Ex. 1-36 | No. 36 |  |  | 107 |
| Ex. 1-37 | No. 37 |  |  | 105 |
| Ex. 1-38 | No. 38 |  |  | 108 |
| Ex. 1-39 | No. 39 |  |  | 108 |
| Ex. 1-40 | No. 40 |  |  | 105 |
| Ex. 1-41 | No. 41 |  |  | 109 |
| Ex. 1-42 | No. 42 |  |  | 105 |
| Ex. 1-43 | No. 43 |  |  | 106 |
| Ex. 1-44 | No. 44 |  |  | 100 |
| Ex. 1-45 | No. 45 |  |  | 107 |
| Ex. 1-46 | No. 46 |  |  | 109 |
| Ex. 1-47 | No. 47 |  |  | 104 |
| Ex. 1-48 | No. 48 |  |  | 107 |
| Ex. 1-49 | No. 49 |  |  | 100 |
| Ex. 1-50 | No. 50 |  |  | 109 |
| Ex. 1-51 | No. 51 |  |  | 113 |

TABLE 3-continued

| | Electrolyte solution No. | Active material of positive electrode | Active material of negative electrode | High-power capacity retention ratio* |
|---|---|---|---|---|
| Ex. 1-52 | No. 52 | | | 105 |
| Ex. 1-53 | No. 53 | | | 107 |
| Ex. 1-54 | No. 54 | | | 100 |
| Ex. 1-55 | No. 55 | | | 103 |
| Ex. 1-56 | No. 56 | | | 105 |
| Ex. 1-57 | No. 57 | | | 103 |
| Ex. 1-58 | No. 58 | | | 104 |
| Ex. 1-59 | No. 59 | | | 100 |
| Ex. 1-60 | No. 60 | | | 105 |
| Ex. 1-61 | No. 61 | | | 110 |
| Ex. 1-62 | No. 62 | | | 105 |
| Ex. 1-63 | No. 63 | | | 108 |
| Ex. 1-64 | No. 64 | | | 100 |

*The values of Examples 1-4 and 1-16 to 1-39 are relative values, where the value of Example 1-26 is taken as 100. The values of Examples 1-40 to 1-44 are relative values, where the value of Example 1-44 is taken as 100. The values of Examples 1-45 to 1-49 are relative values, where the value of Example 1-49 is taken as 100. The values of Examples 1-50 to 1-54 are relative values, where the value of Example 1-54 is taken as 100. The values of Examples 1-55 to 1-59 are relative values, where the value of Example 1-59 is taken as 100. The values of Examples 1-60 to 1-64 are relative values, where the value of Example 1-64 is taken as 100.

The results of the output characteristics evaluation described above showed that higher output characteristics were exhibited in Examples 1-4, 1-16 to 1-25, and 1-27 to 1-39, in which the number of the groups having a carbon-carbon unsaturated bond and being represented by $R^3$s in general formula (2) above was 2 to 3 (i.e., x in general formula (2) above was 2 to 3) than in Example 1-26, in which the number of the groups having a carbon-carbon unsaturated bond was 4 (i.e., x in general formula (2) above was 4).

Likewise, it was shown that higher output characteristics were exhibited in Examples 1-40 to 1-43, in which the above-described x was 2 to 3, than in Example 1-44, in which the above-described x was 4.

Likewise, it was shown that higher output characteristics were exhibited in Examples 1-45 to 1-48, in which the above-described x was 2 to 3, than in Example 1-49, in which the above-described x was 4.

Likewise, it was shown that higher output characteristics were exhibited in Examples 1-50 to 1-53, in which the above-described x was 2 to 3, than in Example 1-54, in which the above-described x was 4.

Likewise, it was shown that higher output characteristics were exhibited in Examples 1-55 to 1-58, in which the above-described x was 2 to 3 than in Example 1-59, in which the above-described x was 4.

Likewise, it was shown that higher output characteristics were exhibited in Examples 1-60 to 1-63, in which the above-described x was 2 to 3, than in Example 1-64, in which the above-described x was 4.

Accordingly, it has been found that when the first compound and the second compound are coexistent in an electrolyte solution, the electrolyte solution, when used for a non-aqueous electrolyte solution battery, makes it possible to exhibit excellent high-temperature cycle characteristics and excellent high-temperature storage characteristics, and that x in general formula (2) above is further preferably 2 to 3, from the viewpoint of output characteristics.

Examples 2-1 to 2-15 and Comparative Examples 2-1 to 2-9

In Examples 2-1 to 2-15 and Comparative Examples 2-1 to 2-9, batteries were evaluated by preparing electrolyte solutions for non-aqueous electrolyte solution batteries and fabricating cells in the same manner as in Example 1-1, except that the negative electrode member and the electrolyte solution were changed as shown in Table 4. Note that, in Examples 2-1 to 2-5 and Comparative Examples 2-1 to 2-3, in which the negative electrode active material was $Li_4Ti_5O_{12}$, each negative electrode member was fabricated by mixing 90% by mass of $Li_4Ti_5O_{12}$ powder with 5% by mass of polyvinylidene fluoride (PVDF) as a binder and 5% by mass of acetylene black as an electrically conductive agent, further adding N-methylpyrrolidone thereto, and applying the obtained paste onto copper foil, followed by drying, and a final charge voltage of 2.7 V and a final discharge voltage of 1.5 V were employed for the battery evaluation. Meanwhile, in Examples 2-6 to 2-10 and Comparative Examples 2-4 to 2-6, in which the negative electrode active material was graphite (containing silicon), each negative electrode member was fabricated by mixing 81% by mass of graphite powder and 9% by mass of silicon powder with 5% by mass of polyvinylidene fluoride (PVDF) as a binder and 5% by mass of acetylene black as a conductive material, further adding N-methylpyrrolidone thereto, and applying the obtained paste onto copper foil, followed by drying, and the same final charge voltage and final discharge voltage as those in Example 1-1 were employed for the battery evaluation. In addition, in Examples 2-11 to 2-15 and Comparative Examples 2-7 to 2-9, in which the negative electrode active material was hard carbon, each negative electrode member was fabricated by mixing 90% by mass of hard carbon powder with 5% by mass of polyvinylidene fluoride (PVDF) as a binder and 5% by mass of acetylene black as an electrically conductive agent, further adding N-methylpyrrolidone thereto, and applying the obtained paste onto copper foil, followed by drying, and a final charge voltage of 4.1 V and a final discharge voltage of 2.2 V were employed for the battery evaluation. Table 4 shows the evaluation results of the high-temperature cycle characteristics and the high-temperature storage characteristics. Note that the evaluation results (the numeric value of the service capacity retention ratio after 500 cycles and the numeric value of the remaining capacity ratio) of each electrode configuration in Table 4 are relative values, where the evaluation results of the comparative example in which the electrolyte solution with Electrolyte Solution No. 65 was used are taken as 100.

TABLE 4

| | Electrolyte solution No. | Active material of positive electrode | Active material of negative electrode | Service capacity retention ratio after 500 cycles* | Remaining capacity ratio* |
|---|---|---|---|---|---|
| Example 2-1 | No. 4 | LiCoO$_2$ | Li$_4$Ti$_5$O$_{12}$ | 105 | 106 |
| Example 2-2 | No. 16 | | | 103 | 104 |
| Example 2-3 | No. 18 | | | 105 | 105 |
| Example 2-4 | No. 19 | | | 103 | 103 |

TABLE 4-continued

| | Electrolyte solution No. | Active material of positive electrode | Active material of negative electrode | Service capacity retention ratio after 500 cycles* | Remaining capacity ratio* |
|---|---|---|---|---|---|
| Example 2-5 | No. 26 | | | 102 | 104 |
| Comp. Ex. 2-1 | No. 65 | | | 100 | 100 |
| Comp. Ex. 2-2 | No. 75 | | | 89 | 82 |
| Comp. Ex. 2-3 | No. 80 | | | 90 | 82 |
| Example 2-6 | No. 4 | | Graphite (containing silicon) | 103 | 109 |
| Example 2-7 | No. 16 | | | 101 | 106 |
| Example 2-8 | No. 18 | | | 102 | 108 |
| Example 2-9 | No. 19 | | | 101 | 106 |
| Example 2-10 | No. 26 | | | 102 | 107 |
| Comp. Ex. 2-4 | No. 65 | | | 100 | 100 |
| Comp. Ex. 2-5 | No. 75 | | | 80 | 78 |
| Comp. Ex. 2-6 | No. 80 | | | 81 | 80 |
| Example 2-11 | No. 4 | | Hard carbon | 111 | 110 |
| Example 2-12 | No. 16 | | | 105 | 105 |
| Example 2-13 | No. 18 | | | 108 | 109 |
| Example 2-14 | No. 19 | | | 107 | 106 |
| Example 2-15 | No. 26 | | | 106 | 108 |
| Comp. Ex. 2-7 | No. 65 | | | 100 | 100 |
| Comp. Ex. 2-8 | No. 75 | | | 79 | 78 |
| Comp. Ex. 2-9 | No. 80 | | | 80 | 78 |

*For each electrode configuration, the values are relative values, where the evaluation results of the comparative example in which the electrolyte solution with Electrolyte Solution No. 65 was used are taken as 100.

Examples 3-1 to 3-20 and Comparative Examples 3-1 to 3-12

In Examples 3-1 to 3-20 and Comparative Examples 3-1 to 3-12, batteries were evaluated by preparing electrolyte solutions for non-aqueous electrolyte solution batteries, and fabricating cells in the same manner as in Example 1-1, except that the positive electrode member, the negative electrode member, and the electrolyte solution were changed as shown in Table 5. Note that each positive electrode member in which the positive electrode active material was $LiNi_{1/3}Co_{1/3}Mn_{1/3}O_2$ was fabricated by mixing 90% by mass of $LiNi_{1/3}Co_{1/3}Mn_{1/3}O_2$ powder with 5% by mass of polyvinylidene fluoride (PVDF) as a binder and 5% by mass of acetylene black as a conductive material, further adding N-methylpyrrolidone thereto, and applying the obtained paste onto aluminum foil, followed by drying. As in the case of Example 1-1, a final charge voltage of 4.3 V and a final discharge voltage of 3.0 V were employed for the battery evaluation of Examples 3-1 to 3-5 and Comparative Examples 3-1 to 3-3, in which the negative electrode active material was graphite. As in the case of Example 2-1, a final charge voltage of 2.8 V and a final discharge voltage of 1.5 V were employed for the battery evaluation of Examples 3-6 to 3-10 and Comparative Examples 3-4 to 3-6, in which the negative electrode active material was $Li_4Ti_5O_{12}$. As in the case of Example 2-6, a final charge voltage of 4.3 V and a final discharge voltage of 3.0 V were employed for the battery evaluation of Examples 3-11 to 3-15 and Comparative Examples 3-7 to 3-9, in which the negative electrode active material was graphite (containing silicon). As in the case of Example 2-11, a final charge voltage of 4.2 V and a final discharge voltage of 2.2 V were employed for the battery evaluation of Examples 3-16 to 3-20 and Comparative Examples 3-10 to 3-12, in which the negative electrode active material was hard carbon. Table 5 shows the evaluation results of the high-temperature cycle characteristics and the high-temperature storage characteristics. Note that the evaluation results (the numeric value of the service capacity retention ratio after 500 cycles and the numeric value of the remaining capacity ratio) of each electrode configuration in Table 5 are relative values, where the evaluation results of the comparative example in which the electrolyte solution with Electrolyte Solution No. 65 was used are taken as 100.

TABLE 5

| | Electrolyte solution No. | Active material of positive electrode | Active material of negative electrode | Service capacity retention ratio after 500 cycles* | Remaining capacity ratio* |
|---|---|---|---|---|---|
| Example 3-1 | No. 4 | $LiNi_{1/3}Co_{1/3}Mn_{1/3}O_2$ | Graphite | 109 | 111 |
| Example 3-2 | No. 16 | | | 104 | 106 |
| Example 3-3 | No. 18 | | | 108 | 110 |
| Example 3-4 | No. 19 | | | 106 | 106 |
| Example 3-5 | No. 26 | | | 105 | 108 |
| Comp. Ex. 3-1 | No. 65 | | | 100 | 100 |
| Comp. Ex. 3-2 | No. 75 | | | 83 | 75 |
| Comp. Ex. 3-3 | No. 80 | | | 83 | 76 |
| Example 3-6 | No. 4 | | $Li_4Ti_5O_{12}$ | 106 | 107 |
| Example 3-7 | No. 16 | | | 103 | 105 |
| Example 3-8 | No. 18 | | | 105 | 106 |
| Example 3-9 | No. 19 | | | 104 | 104 |
| Example 3-10 | No. 26 | | | 103 | 104 |
| Comp. Ex. 3-4 | No. 65 | | | 100 | 100 |

TABLE 5-continued

| | Electrolyte solution No. | Active material of positive electrode | Active material of negative electrode | Service capacity retention ratio after 500 cycles* | Remaining capacity ratio* |
|---|---|---|---|---|---|
| Comp. Ex. 3-5 | No. 75 | | | 91 | 83 |
| Comp. Ex. 3-6 | No. 80 | | | 91 | 84 |
| Example 3-11 | No. 4 | | Graphite | 104 | 108 |
| Example 3-12 | No. 16 | | (containing | 102 | 105 |
| Example 3-13 | No. 18 | | silicon) | 104 | 107 |
| Example 3-14 | No. 19 | | | 102 | 106 |
| Example 3-15 | No. 26 | | | 103 | 107 |
| Comp. Ex. 3-7 | No. 65 | | | 100 | 100 |
| Comp. Ex. 3-8 | No. 75 | | | 80 | 80 |
| Comp. Ex. 3-9 | No. 80 | | | 82 | 81 |
| Example 3-16 | No. 4 | | Hard carbon | 110 | 112 |
| Example 3-17 | No. 16 | | | 105 | 107 |
| Example 3-18 | No. 18 | | | 107 | 110 |
| Example 3-19 | No. 19 | | | 106 | 107 |
| Example 3-20 | No. 26 | | | 104 | 109 |
| Comp. Ex. 3-10 | No. 65 | | | 100 | 100 |
| Comp. Ex. 3-11 | No. 75 | | | 81 | 77 |
| Comp. Ex. 3-12 | No. 80 | | | 81 | 79 |

*For each electrode configuration, the values are relative values, where the evaluation results of the comparative example in which the electrolyte solution with Electrolyte Solution No. 65 was used are taken as 100.

Examples 4-1 to 4-15 and Comparative Examples 4-1 to 4-9

In Examples 4-1 to 4-15 and Comparative Examples 4-1 to 4-9, batteries were evaluated by preparing electrolyte solutions for non-aqueous electrolyte solution batteries, and fabricating cells in the same manner as in Example 1-1, except that the positive electrode member and the electrolyte solution were changed as shown in Table 6. Note that, in Examples 4-1 to 4-5 and Comparative Examples 4-1 to 4-3, where the positive electrode active material was $LiNi_{0.8}Co_{0.15}Al_{0.05}O_2$, each positive electrode member was fabricated by mixing 90% by mass of $LiNi_{0.8}Co_{0.15}Al_{0.05}O_2$ powder with 5% by mass of polyvinylidene fluoride (PVDF) as a binder and 5% by mass of acetylene black as a conductive material, further adding N-methylpyrrolidone thereto, and applying the obtained paste onto aluminum foil, followed by drying, and a final charge voltage of 4.3 V and a final discharge voltage of 3.0 V were employed for the battery evaluation.

Meanwhile, in Examples 4-6 to 4-10 and Comparative Examples 4-4 to 4-6, where the positive electrode active material was $LiMn_2O_4$, each positive electrode member was fabricated by mixing 90% by mass of $LiMn_2O_4$ powder with 5% by mass of polyvinylidene fluoride (PVDF) as a binder and 5% by mass of acetylene black as a conductive material, further adding N-methylpyrrolidone thereto, and applying the obtained paste onto aluminum foil, followed by drying, and a final charge voltage of 4.2 V and a final discharge voltage of 3.0 V were employed for the battery evaluation. Meanwhile, in Examples 4-11 to 4-15 and Comparative Examples 4-7 to 4-9, where the positive electrode active material was $LiFePO_4$, each positive electrode member was fabricated by mixing 90% by mass of $LiFePO_4$ powder coated with amorphous carbon with 5% by mass of polyvinylidene fluoride (PVDF) as a binder and 5% by mass of acetylene black as a conductive material, further adding N-methylpyrrolidone thereto, and applying the obtained paste onto aluminum foil, followed by drying, and a final charge voltage of 4.2 V and a final discharge voltage of 2.5 V were employed for the battery evaluation. Table 6 shows the evaluation results of the high-temperature cycle characteristics and the high-temperature storage characteristics. Note that the evaluation results (the numeric value of the service capacity retention ratio after 500 cycles and the numeric value of the remaining capacity ratio) of each electrode configuration in Table 6 are relative values, where the evaluation results of the comparative example in which the electrolyte solution with Electrolyte Solution No. 65 was used are taken as 100.

TABLE 6

| | Electrolyte solution No. | Active material of positive electrode | Active material of negative electrode | Service capacity retention ratio after 500 cycles* | Remaining capacity ratio* |
|---|---|---|---|---|---|
| Example 4-1 | No. 4 | $LiNi_{0.8}Co_{0.15}Al_{0.05}O_2$ | Graphite | 107 | 110 |
| Example 4-2 | No. 16 | | | 102 | 106 |
| Example 4-3 | No. 18 | | | 105 | 109 |
| Example 4-4 | No. 19 | | | 104 | 105 |
| Example 4-5 | No. 26 | | | 102 | 106 |
| Comp. Ex. 4-1 | No. 65 | | | 100 | 100 |
| Comp. Ex. 4-2 | No. 75 | | | 84 | 78 |
| Comp. Ex. 4-3 | No. 80 | | | 85 | 78 |
| Example 4-6 | No. 4 | $LiMn_2O_4$ | Graphite | 108 | 112 |
| Example 4-7 | No. 16 | | | 104 | 108 |
| Example 4-8 | No. 18 | | | 106 | 110 |
| Example 4-9 | No. 19 | | | 105 | 108 |
| Example 4-10 | No. 26 | | | 105 | 108 |
| Comp. Ex. 4-4 | No. 65 | | | 100 | 100 |
| Comp. Ex. 4-5 | No. 75 | | | 82 | 74 |

TABLE 6-continued

| | Electrolyte solution No. | Active material of positive electrode | Active material of negative electrode | Service capacity retention ratio after 500 cycles* | Remaining capacity ratio* |
|---|---|---|---|---|---|
| Comp. Ex. 4-6 | No. 80 | | | 82 | 76 |
| Example 4-11 | No. 4 | LiFePO$_4$ | Graphite | 104 | 107 |
| Example 4-12 | No. 16 | | | 102 | 103 |
| Example 4-13 | No. 18 | | | 103 | 106 |
| Example 4-14 | No. 19 | | | 102 | 103 |
| Example 4-15 | No. 26 | | | 103 | 104 |
| Comp. Ex. 4-7 | No. 65 | | | 100 | 100 |
| Comp. Ex. 4-8 | No. 75 | | | 90 | 84 |
| Comp. Ex. 4-9 | No. 80 | | | 91 | 85 |

*For each electrode configuration, the values are relative values, where the evaluation results of the comparative example in which the electrolyte solution with Electrolyte Solution No. 65 was used are taken as 100.

As described above, it was found that that, in each of the examples in which Li$_4$Ti$_5$O$_{12}$, graphite (containing silicon), or hard carbon was used as the negative electrode active material, the use of the electrolyte solution for a non-aqueous electrolyte solution battery of the present invention improved the high-temperature cycle characteristics and the high-temperature storage characteristics in comparison with the corresponding comparative example. Accordingly, it has been shown that the use of the electrolyte solution for a non-aqueous electrolyte solution battery of the present invention makes it possible to obtain a non-aqueous electrolyte solution battery which exhibits excellent high-temperature cycle characteristics and excellent high-temperature storage characteristics, irrespective of the type of the negative electrode active material. In addition, as described above, it was found that that, in each of the examples in which LiNi$_{1/3}$Co$_{1/3}$Mn$_{1/3}$O$_2$, LiNi$_{0.8}$Co$_{0.15}$Al$_{0.05}$O$_2$, LiMn$_2$O$_4$, or LiFePO$_4$ was used as the positive electrode active material, the use of the electrolyte solution for a non-aqueous electrolyte solution battery of the present invention improved the high-temperature cycle characteristics and the high-temperature storage characteristics in comparison with the corresponding comparative example. Accordingly, it has been shown that the use of the electrolyte solution for a non-aqueous electrolyte solution battery of the present invention makes it possible to obtain a non-aqueous electrolyte solution battery which exhibits excellent high-temperature cycle characteristics and excellent high-temperature storage characteristics, irrespective of the type of the positive electrode active material.

Next, the output characteristics of batteries of Examples 2-1 to 2-15, 3-1 to 3-20, and 4-1 to 4-15 were evaluated by the above-described method. Among the battery configurations of Examples 2-1 to 2-15, 3-1 to 3-20, and 4-1 to 4-15, the electrolyte solution (electrolyte solution No. 4, 16, 18, 19, or 26), the positive electrode member, and the negative electrode member were changed as shown in Table 7 in the systems in which the type of the second compound was changed, while the first compound was fixed to lithium difluorobis(oxalato)phosphate at a concentration of 1.0% by mass, and the concentration of the second compound was fixed to 0.5% by mass. Table 7 shows the evaluation results. Note that the numeric values of the high-power capacity retention ratio shown in Examples 2-1 to 2-4 in Table 7 are relative values, where the high-power capacity retention ratio of Example 2-5 is taken as 100. The numeric values of the high-power capacity retention ratio shown in Examples 2-6 to 2-9 are relative values, where the high-power capacity retention ratio of Example 2-10 is taken as 100. The numeric values of the high-power capacity retention ratio shown in Examples 2-11 to 2-14 are relative values, where the high-power capacity retention ratio of Example 2-15 is taken as 100. The numeric values of the high-power capacity retention ratio shown in Examples 3-1 to 3-4 are relative values, where the high-power capacity retention ratio of Example 3-5 is taken as 100. The numeric values of the high-power capacity retention ratio shown in Examples 3-6 to 3-9 are relative values, where the high-power capacity retention ratio of Example 3-10 is taken as 100. The numeric values of the high-power capacity retention ratio shown in Examples 3-11 to 3-14 are relative values, where the high-power capacity retention ratio of Example 3-15 is taken as 100. The numeric values of the high-power capacity retention ratio shown in Examples 3-16 to 3-19 are relative values, where the high-power capacity retention ratio of Example 3-20 is taken as 100. The numeric values of the high-power capacity retention ratio shown in Examples 4-1 to 4-4 are relative values, where the high-power capacity retention ratio of Example 4-5 is taken as 100. The numeric values of the high-power capacity retention ratio shown in Examples 4-6 to 4-9 are relative values, where the high-power capacity retention ratio of Example 4-10 is taken as 100. The numeric values of the high-power capacity retention ratio shown in Examples 4-11 to 4-14 are relative values, where the high-power capacity retention ratio of Example 4-15 is taken as 100.

TABLE 7

| | Electrolyte solution No. | Active material of positive electrode | Active material of negative electrode | High-power capacity retention ratio* |
|---|---|---|---|---|
| Ex. 2-1 | No. 4 | LiCoO$_2$ | Li$_4$Ti$_5$O$_{12}$ | 105 |
| Ex. 2-2 | No. 16 | | | 108 |
| Ex. 2-3 | No. 18 | | | 104 |
| Ex. 2-4 | No. 19 | | | 105 |
| Ex. 2-5 | No. 26 | | | 100 |
| Ex. 2-6 | No. 4 | | Graphite (containing silicon) | 102 |
| Ex. 2-7 | No. 16 | | | 104 |

TABLE 7-continued

| | Electrolyte solution No. | Active material of positive electrode | Active material of negative electrode | High-power capacity retention ratio* |
|---|---|---|---|---|
| Ex. 2-8 | No. 18 | | | 102 |
| Ex. 2-9 | No. 19 | | | 103 |
| Ex. 2-10 | No. 26 | | | 100 |
| Ex. 2-11 | No. 4 | | Hard carbon | 105 |
| Ex. 2-12 | No. 16 | | | 107 |
| Ex. 2-13 | No. 18 | | | 103 |
| Ex. 2-14 | No. 19 | | | 104 |
| Ex. 2-15 | No. 26 | | | 100 |
| Ex. 3-1 | No. 4 | $LiNi_{1/3}Co_{1/3}Mn_{1/3}O_2$ | Graphite | 108 |
| Ex. 3-2 | No. 16 | | | 115 |
| Ex. 3-3 | No. 18 | | | 107 |
| Ex. 3-4 | No. 19 | | | 110 |
| Ex. 3-5 | No. 26 | | | 100 |
| Ex. 3-6 | No. 4 | | $Li_4Ti_5O_{12}$ | 104 |
| Ex. 3-7 | No. 16 | | | 108 |
| Ex. 3-8 | No. 18 | | | 105 |
| Ex. 3-9 | No. 19 | | | 105 |
| Ex. 3-10 | No. 26 | | | 100 |
| Ex. 3-11 | No. 4 | | Graphite (containing silicon) | 102 |
| Ex. 3-12 | No. 16 | | | 105 |
| Ex. 3-13 | No. 18 | | | 103 |
| Ex. 3-14 | No. 19 | | | 103 |
| Ex. 3-15 | No. 26 | | | 100 |
| Ex. 3-16 | No. 4 | | Hard carbon | 105 |
| Ex. 3-17 | No. 16 | | | 108 |
| Ex. 3-18 | No. 18 | | | 104 |
| Ex. 3-19 | No. 19 | | | 103 |
| Ex. 3-20 | No. 26 | | | 100 |
| Ex. 4-1 | No. 4 | $LiNi_{0.8}Co_{0.15}Al_{0.05}O_2$ | Graphite | 104 |
| Ex. 4-2 | No. 16 | | | 109 |
| Ex. 4-3 | No. 18 | | | 104 |
| Ex. 4-4 | No. 19 | | | 105 |
| Ex. 4-5 | No. 26 | | | 100 |
| Ex. 4-6 | No. 4 | $LiMn_2O_4$ | Graphite | 109 |
| Ex. 4-7 | No. 16 | | | 114 |
| Ex. 4-8 | No. 18 | | | 107 |
| Ex. 4-9 | No. 19 | | | 109 |
| Ex. 4-10 | No. 26 | | | 100 |
| Ex. 4-11 | No. 4 | $LiFePO_4$ | Graphite | 103 |
| Ex. 4-12 | No. 16 | | | 105 |
| Ex. 4-13 | No. 18 | | | 101 |
| Ex. 4-14 | No. 19 | | | 102 |
| Ex. 4-15 | No. 26 | | | 100 |

*The values of Examples 2-1 to 2-4 are relative values, where the value of Example 2-5 is taken as 100. The values of Examples 2-6 to 2-9 are relative values, where the value of Example 2-10 is taken as 100. The values of Examples 2-11 to 2-14 are relative values, where the value of Example 2-15 is taken as 100. The values of Examples 3-1 to 3-4 are relative values, where the value of Example 3-5 is taken as 100. The values of Examples 3-6 to 3-9 are relative values, where the value of Example 3-10 is taken as 100. The values of Examples 3-11 to 3-14 are relative values, where the value of Example 3-15 is taken as 100. The values of Examples 3-16 to 3-19 are relative values, where the value of Example 3-20 is taken as 100. The values of Examples 4-1 to 4-4 are relative values, where the value of Example 4-5 is taken as 100. The values of Examples 4-6 to 4-9 are relative values, where the value of Example 4-10 is taken as 100. The values of Examples 4-11 to 4-14 are relative values, where the value of Example 4-15 is taken as 100.

The results of the above-described output characteristics evaluation showed that higher output characteristics were exhibited in Examples 2-1 to 2-4, in which the number of the groups having a carbon-carbon unsaturated bond and being represented by $R^3$s in general formula (2) above was 2 to 3 (i.e., x in general formula (2) above was 2 to 3), than in Example 2-5, in which the number of the groups having a carbon-carbon unsaturated bond was 4 (i.e., x in general formula (2) above was 4).

Likewise, it was shown that higher output characteristics were exhibited in Examples 2-6 to 2-9, in which the above-described x was 2 to 3, than in Example 2-10, in which the above-described x was 4.

Likewise, it was shown that higher output characteristics were exhibited in Examples 2-11 to 2-14, in which the above-described x was 2 to 3, than in Example 2-15, in which the above-described x was 4.

Likewise, it was shown that higher output characteristics were exhibited in Examples 3-1 to 3-4, in which the above-described x was 2 to 3, than in Example 3-5, in which the above-described x was 4.

Likewise, it was shown that higher output characteristics were exhibited in Examples 3-6 to 3-9, in which the above-described x was 2 to 3, than in Example 3-10, in which the above-described x was 4.

Likewise, it was shown that higher output characteristics were exhibited in Examples 3-11 to 3-14, in which the above-described x was 2 to 3, than in Example 3-15, in which the above-described x was 4.

Likewise, it was shown that higher output characteristics were exhibited in Examples 3-16 to 3-19, in which the above-described x was 2 to 3, than in Example 3-20, in which the above-described x was 4.

Likewise, it was shown that higher output characteristics were exhibited in Examples 4-1 to 4-4, in which the above-described x was 2 to 3, than in Example 4-5, in which the above-described x was 4.

Likewise, it was shown that higher output characteristics were exhibited in Examples 4-6 to 4-9, in which the above-described x was 2 to 3, than in Example 4-10, in which the above-described x was 4.

Likewise, it was shown that higher output characteristics were exhibited in Examples 4-11 to 4-14, in which the above-described x was 2 to 3 than in Example 4-15, in which the above-described x was 4.

Accordingly, it has been found that when the first compound and the second compound are coexistent in an electrolyte solution, the electrolyte solution, when used for a non-aqueous electrolyte solution battery, makes it possible to exhibit excellent high-temperature cycle characteristics and excellent high-temperature storage characteristics irrespective of the types of the negative electrode active material and the positive electrode active material, and that x in general formula (2) above is further preferably 2 to 3, from the viewpoint of output characteristics.

Example 5-1

An electrolyte solution for a non-aqueous electrolyte solution battery was prepared by using a mixture solvent of ethylene carbonate and diethyl carbonate at a volume ratio of 1:1 as a non-aqueous solvent, and dissolving $NaPF_6$ as a solute at a concentration of 1.0 mol/L, sodium tetrafluoro (oxalato)phosphate as the first compound at a concentration of 1.0% by mass, Compound No. 1 described above as the material was $NaFe_{0.5}Co_{0.5}O_2$, was fabricated by mixing 90% by mass of $NaFe_{0.5}Co_{0.5}O_2$ powder with 5% by mass of polyvinylidene fluoride (PVDF) as a binder and 5% by mass of acetylene black as a conductive material, further adding N-methylpyrrolidone thereto, and applying the obtained paste onto aluminum foil, followed by drying, and a final charge voltage of 3.8 V and a final discharge voltage of 1.5 V were employed for the battery evaluation.

Examples 5-2 to 5-6 and Comparative Examples 5-1 to 5-6

In Examples 5-2 to 5-6 and Comparative Examples 5-1 to 5-6, batteries were evaluated by preparing electrolyte solutions for non-aqueous electrolyte solution batteries, and fabricating cells in the same manner as in Example 5-1, except that the types and the concentrations of the first compound and the second compound were changed as shown in Table 8. Table 8 shows the evaluation results of the high-temperature cycle characteristics and the high-temperature storage characteristics. Note that, regarding the evaluation results (the numeric values of the service capacity retention ratio after 500 cycles and the numeric values of the remaining capacity ratio) in Table 8, the evaluation results of Examples 5-1 to 5-3 are relative values, where the evaluation results of Comparative Example 5-1 were taken as 100, and the evaluation results of Examples 5-4 to 5-6 are relative values, where the evaluation results of Comparative Example 5-2 are taken as 100. Meanwhile, the numeric values of the evaluation results shown in Comparative Examples 5-3 to 5-6 are relative values, where the evaluation results of Comparative Example 5-1 are taken as 100.

TABLE 8

| | First compound | | Second compound | | Service capacity | Remaining |
|---|---|---|---|---|---|---|
| | Name of compound | Concentration (% by mass) | Comp. No. | Concentration (% by mass) | retention ratio after 500 cycles* | capacity ratio* |
| Example 5-1 | Sodium tetrafluoro (oxalato)phosphate | 1.0 | No. 1 | 0.5 | 108 | 114 |
| Example 5-2 | | 1.0 | No. 5 | 0.5 | 105 | 108 |
| Example 5-3 | | 1.0 | No. 12 | 0.5 | 105 | 109 |
| Example 5-4 | Sodium difluorobis (oxalato)phosphate | 1.0 | No. 1 | 0.5 | 107 | 110 |
| Example 5-5 | | 1.0 | No. 5 | 0.5 | 102 | 105 |
| Example 5-6 | | 1.0 | No. 12 | 0.5 | 103 | 108 |
| Comp. Ex. 5-1 | Sodium tetrafluoro (oxalato)phosphate | 1.0 | None | 0 | 100 | 100 |
| Comp. Ex. 5-2 | Sodium difluorobis (oxalato)phosphate | 1.0 | None | 0 | 100 | 100 |
| Comp. Ex. 5-3 | None | 0 | No. 1 | 0.5 | 71 | 68 |
| Comp. Ex. 5-4 | None | 0 | No. 5 | 0.5 | 68 | 67 |
| Comp. Ex. 5-5 | None | 0 | No. 12 | 0.5 | 70 | 66 |
| Comp. Ex. 5-6 | None | 0 | None | 0 | 73 | 69 |

*The values of Examples 5-1 to 5-3 are relative values, where the value of Comparative Example 5-1 is taken as 100.
The values of Examples 5-4 to 5-6 are relative values, where the value of Comparative Example 5-2 is taken as 100.
The values of Comparative Examples 5-3 to 5-6 are relative values, where the value of Comparative Example 5-1 is taken as 100.

second compound at a concentration of 0.5% by mass in the solvent. Table 8 shows the preparation conditions of the electrolyte solution.

A cell was fabricated by using this electrolyte solution in the same manner as in Example 1-1, except that $NaFe_{0.5}CO_{0.5}O_2$ was used as the positive electrode material and hard carbon was used as the negative electrode material, and the high-temperature cycle characteristics and the high-temperature storage characteristic were evaluated in the same manner as in Example 1-1. Note that the positive electrode member, in which the positive electrode active A comparison of the above-described results showed that, also in sodium ion batteries, the use of the first compound and the second compound in combination improved the high-temperature cycle characteristics and the high-temperature storage characteristics in comparison with Comparative Examples 5-1 and 5-2, where a first compound was used alone. Likewise, it was found that the high-temperature cycle characteristics and the high-temperature storage characteristics were improved in comparison with Comparative Examples 5-3 to 5-5, where a second compound was used alone.

Next, the output characteristics of batteries of Examples 5-1 to 5-6 were evaluated by the above-described method. Note that, as shown in Table 9, Examples 5-1 to 5-6 are systems in which the types of the first compound and second compound were changed, while the concentration of the first compound was fixed to 1.0% by mass, and the concentration of the second compound was fixed to 0.5% by mass. Table 9 shows the evaluation results. Note that the numeric values of the high-power capacity retention ratio shown in Examples 5-1 and 5-2 in Table 9 are relative values, where the high-power capacity retention ratio of Example 5-3 is taken as 100. The numeric values of the high-power capacity retention ratio shown in Examples 5-4 and 5-5 are relative values, where the high-power capacity retention ratio of Example 5-6 is taken as 100.

TABLE 9

|  | First compound | | Second compound | | High-power capacity retention ratio* |
|---|---|---|---|---|---|
|  | Name of compound | Concentration (% by mass) | Comp. No. | Concentration (% by mass) |  |
| Example 5-1 | Sodium tetrafluoro(oxalato)phosphate | 1.0 | No. 1 | 0.5 | 108 |
| Example 5-2 |  | 1.0 | No. 5 | 0.5 | 109 |
| Example 5-3 |  | 1.0 | No. 12 | 0.5 | 100 |
| Example 5-4 | Sodium difluorobis(oxalato)phosphate | 1.0 | No. 1 | 0.5 | 107 |
| Example 5-5 |  | 1.0 | No. 5 | 0.5 | 108 |
| Example 5-6 |  | 1.0 | No. 12 | 0.5 | 100 |

*The values of Examples 5-1 to 5-2 are relative values, where the value of Example 5-3 is taken as 100. The values of Examples 5-4 and 5-5 are relative values, where the value of Example 5-6 is taken as 100.

The results of the above-described output characteristics evaluation showed that higher output characteristics were exhibited in Examples 5-1 to 5-2, in which the number of the groups having a carbon-carbon unsaturated bond and being represented by $R^3$s in general formula (2) above was 2 to 3 (i.e., x in general formula (2) above was 2 to 3) than in Example 5-3, in which the number of the groups having a carbon-carbon unsaturated bond was 4 (i.e., x in general formula (2) above was 4).

Likewise, it was shown that higher output characteristics were exhibited in Examples 5-4 and 5-5, in which the above-described x was 2 to 3 than in Example 5-6, in which the above-described x was 4.

Accordingly, also in the case of sodium ion batteries, it has been found that when the first compound and the second compound are coexistent in an electrolyte solution, the electrolyte solution, when used for a non-aqueous electrolyte solution battery, makes it possible to exhibit excellent high-temperature cycle characteristics and excellent high-temperature storage characteristics, and that x in general formula (2) above is further preferably 2 to 3, from the viewpoint of output characteristics.

The invention claimed is:

1. An electrolyte solution for a non-aqueous electrolyte solution battery, comprising at least:
   a non-aqueous solvent;
   a solute;
   at least one first compound selected from the group consisting of tris(oxalato) phosphoric acid salts, difluorobis(oxalato) phosphoric acid salts, tetrafluoro(oxalato) phosphoric acid salts, and tetrafluoro(malonato) phosphoric acid salts; and
   at least one second compound represented by the following general formula (2):

$$Si(R^3)_x(R^4)_{4-x} \qquad (2)$$

wherein, in general formula (2), $R^3$s each independently represent a group selected from the group consisting of a vinyl group, an allyl group, a 1-propenyl group, an ethynyl group, and a 2-propynyl group; $R^4$s each independently represent a group selected from the group consisting of a fluorine atom, a methyl group, an ethyl group, a propyl group, a 2,2,2-trifluoroethyl group, a 2,2,3,3-tetrafluoropropyl group, a 1,1,1-trifluoroisopropyl group, a 1,1,1,3,3,3-hexafluoroisopropyl group, a 2,2,2-trifluoroethoxy group, a 2,2,3,3-tetrafluoropropoxy group, a 2,2,3,3,3-pentafluoropropoxy group, a 1,1,1-trifluoroisopropoxy group, and a 1,1,1,3,3,3-hexafluoroisopropoxy group; and x is 2 to 4; and wherein the concentration of the first compound is in a range from 0.07 to 7.0% by mass relative to the total amount of the electrolyte solution for a non-aqueous electrolyte solution battery; and wherein the concentration of the second compound is in a range from 0.005 to 7.0% by mass relative to the total amount of the electrolyte solution for a non-aqueous electrolyte solution battery.

2. The electrolyte solution for a non-aqueous electrolyte solution battery according to claim 1, wherein
   x in general formula (2) is 2 to 3.

3. The electrolyte solution for a non-aqueous electrolyte solution battery according to claim 1, wherein
   the solute is at least one selected from the group consisting of lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(fluorosulfonyl)imide ($LiN(FSO_2)_2$), lithium bis(difluorophosphoryl)imide ($LiN(POF_2)_2$), and lithium difluorophosphate ($LiPO_2F_2$).

4. The electrolyte solution for a non-aqueous electrolyte solution battery according to claim 1, wherein
   the non-aqueous solvent is at least one selected from the group consisting of cyclic carbonates, open-chain carbonates, cyclic esters, open-chain esters, cyclic ethers, open-chain ethers, sulfone compounds, sulfoxide compounds, and ionic liquids.

5. A non-aqueous electrolyte solution battery, comprising at least:

a positive electrode;
a negative electrode; and
an electrolyte solution for a non-aqueous electrolyte solution battery, wherein the electrolyte solution for a non-aqueous electrolyte solution battery is the electrolyte solution for a non-aqueous electrolyte solution battery according to claim 1.

6. The electrolyte solution for a non-aqueous electrolyte solution battery according to claim 1, wherein
in general formula (2), $R^4$s each independently represent a group selected from the group consisting of a methyl group, an ethyl group, a propyl group, a 2,2,2-trifluoroethyl group, a 2,2,3,3-tetrafluoropropyl group, a 1,1,1-trifluoroisopropyl group, a 1,1,1,3,3,3-hexafluoroisopropyl group, a 2,2,2-trifluoroethoxy group, a 2,2,3,3-tetrafluoropropoxy group, a 2,2,3,3,3-pentafluoropropoxy group, a 1,1,1-trifluoroisopropoxy group, and a 1,1,1,3,3,3-hexafluoroisopropoxy group.

7. The electrolyte solution for a non-aqueous electrolyte solution battery according to claim 1, wherein
in general formula (2), $R^4$s each independently represent a group selected from the group consisting of a methyl group, an ethyl group, a propyl group, a 2,2,2-trifluoroethyl group, a 2,2,3,3-tetrafluoropropyl group, a 1,1,1-trifluoroisopropyl group, and a 1,1,1,3,3,3-hexafluoroisopropyl group.

8. The electrolyte solution for a non-aqueous electrolyte solution battery according to claim 1, wherein
the second compound is selected from the group consisting of the following compounds, Compound No. 1 to Compound No. 25:

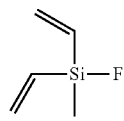

Compound No. 1

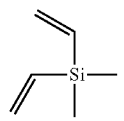

Coumpound No.2

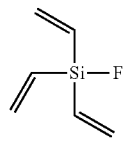

Compound No. 3

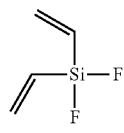

Compound No. 4

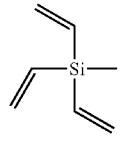

Compound No. 5

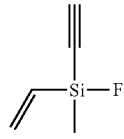

Compound No. 6

-continued

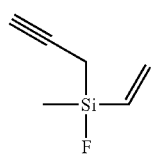

Compound No. 7

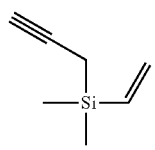

Compound No. 8

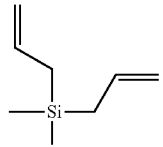

Compound No. 9

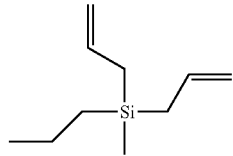

Compound No. 10

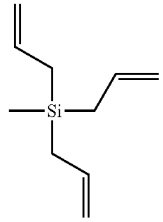

Compound No. 11

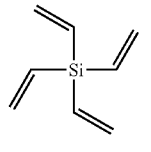

Compound No. 12

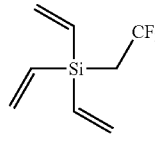

Compound No. 13

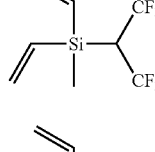

Compound No. 14

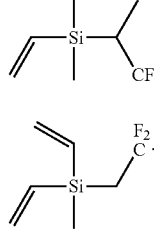

Compound No. 15

Compound No. 16

Compound No. 17
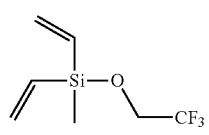
Compound No. 18
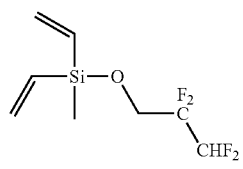
Compound No. 19
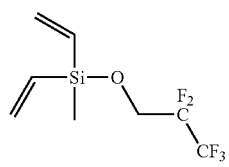
Compound No. 20
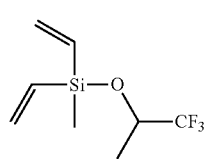
Compound No. 21
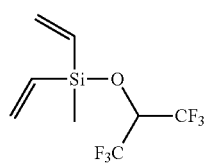
Compound No. 22
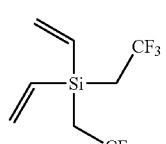
Compound No. 23
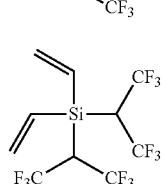
Compound No. 24
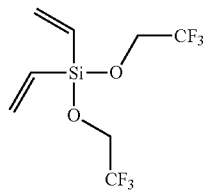
Compound No. 25
* * * * *